US010953976B2

United States Patent
Tao et al.

(10) Patent No.: US 10,953,976 B2
(45) Date of Patent: *Mar. 23, 2021

(54) AIR VEHICLE SYSTEM HAVING DEPLOYABLE AIRFOILS AND RUDDER

(71) Applicant: AEROVIRONMENT, INC., Monrovia, CA (US)

(72) Inventors: Tony Shuo Tao, Simi Valley, CA (US); Nathan Olson, Simi Valley, CA (US); Carlos Thomas Miralles, Burbank, CA (US); Robert Nickerson Plumb, Los Angeles, CA (US)

(73) Assignee: AEROVIRONMENT, INC., Simi Valley, CA (US)

(*) Notice: Subject to any disclaimer, the term of this patent is extended or adjusted under 35 U.S.C. 154(b) by 38 days.

This patent is subject to a terminal disclaimer.

(21) Appl. No.: 14/636,019

(22) Filed: Mar. 2, 2015

(65) Prior Publication Data

US 2016/0009370 A1 Jan. 14, 2016

Related U.S. Application Data

(63) Continuation of application No. 13/524,937, filed on Jun. 15, 2012, now Pat. No. 8,985,504, which is a
(Continued)

(51) Int. Cl.
*B64C 5/12* (2006.01)
*B64C 3/56* (2006.01)
(Continued)

(52) U.S. Cl.
CPC .............. *B64C 3/56* (2013.01); *B64C 3/44* (2013.01); *B64C 3/50* (2013.01); *B64C 5/12* (2013.01);
(Continued)

(58) Field of Classification Search
CPC ..... B64C 3/56; B64C 9/02; B64C 5/12; B64C 2201/08; B64C 2201/021; B64C 2201/102
See application file for complete search history.

(56) References Cited

U.S. PATENT DOCUMENTS 2,444,332 A    6/1948   Earl et al.
2,460,289 A *   2/1949   Hickman ............... F42B 15/00
                                                                                                           102/374
(Continued)

FOREIGN PATENT DOCUMENTS

CA           2659111 C     7/2011
CN          85104530 A     1/1987
(Continued)

OTHER PUBLICATIONS

BusinessWire; First Test Flight of Coyote Unmanned Aircraft System; Jan. 19, 2010; YouTube; <https://www.youtube.com/watch?v=0MmdHLRxIN4>. (Year: 2010).*
(Continued)

*Primary Examiner* — Richard R. Green
*Assistant Examiner* — Michael A. Fabula
(74) *Attorney, Agent, or Firm* — Concept IP LLP; Michael Zarrabian; Eric Aagaard

(57) ABSTRACT

A system comprising an aerial vehicle or an unmanned aerial vehicle (UAV) including: a fuselage; a first pair of airfoils rotatable between a retracted position and a deployed position, the deployed position extending out from the fuselage and the retracted position extending substantially along a first portion on an exterior of the fuselage; a second pair of airfoils rotatable between a second retracted position and a second deployed position, the second deployed position extending out from the fuselage and the second retracted position extending substantially along the first portion on the
(Continued)

exterior of the fuselage; and a rudder foldable against the fuselage in a pre-deployment position.

13 Claims, 19 Drawing Sheets

Related U.S. Application Data continuation of application No. 13/318,459, filed as application No. PCT/US2010/048323 on Sep. 9, 2010, now Pat. No. 9,108,713.

(60) Provisional application No. 61/240,985, filed on Sep. 9, 2009.

(51) Int. Cl.
| | |
|---|---|
| B64C 13/34 | (2006.01) |
| B64C 3/44 | (2006.01) |
| B64C 3/50 | (2006.01) |
| B64C 13/18 | (2006.01) |
| B64C 9/36 | (2006.01) |
| B64C 39/02 | (2006.01) |
| B64C 9/02 | (2006.01) |
| B64C 9/08 | (2006.01) |
| B64C 9/18 | (2006.01) |
| B64C 11/00 | (2006.01) |
| B64C 9/00 | (2006.01) |

(52) U.S. Cl.
CPC ............ B64C 9/02 (2013.01); B64C 9/08 (2013.01); B64C 9/18 (2013.01); B64C 9/36 (2013.01); B64C 11/00 (2013.01); B64C 13/18 (2013.01); B64C 13/34 (2013.01); B64C 39/024 (2013.01); B64C 2009/005 (2013.01); B64C 2201/021 (2013.01); B64C 2201/08 (2013.01); B64C 2201/102 (2013.01); B64C 2201/121 (2013.01); B64C 2201/14 (2013.01); B64C 2201/145 (2013.01); B64C 2201/146 (2013.01)

(56) References Cited

U.S. PATENT DOCUMENTS

| | | | |
|---|---|---|---|
| 2,512,069 A | 6/1950 | Mull | |
| 2,750,133 A | 6/1956 | Lebold | |
| 2,752,110 A | 6/1956 | Peterson | |
| 2,996,011 A | 8/1961 | Dunlap | |
| 3,083,936 A | 4/1963 | Rethorst | |
| 3,147,939 A | 9/1964 | Clarkson | |
| 3,223,361 A * | 12/1965 | Girard | B64C 31/032 |
| | | | 244/49 |
| 3,262,391 A | 7/1966 | Shober | |
| 3,347,466 A | 10/1967 | Nichols | |
| 3,415,467 A * | 12/1968 | Barringer | F42B 8/24 |
| | | | 244/3.29 |
| 3,790,103 A | 2/1974 | Peoples | |
| 3,916,560 A * | 11/1975 | Becker | A63H 27/14 |
| | | | 446/62 |
| 4,022,403 A * | 5/1977 | Chiquet | B61B 15/00 |
| | | | 104/23.1 |
| 4,076,187 A | 2/1978 | Metz | |
| 4,090,684 A | 5/1978 | Look et al. | |
| 4,106,727 A * | 8/1978 | Ortell | B64C 39/024 |
| | | | 244/218 |
| 4,175,720 A * | 11/1979 | Craig | F42B 10/14 |
| | | | 244/3.28 |
| 4,209,147 A * | 6/1980 | Jones, Jr. | B63B 27/14 |
| | | | 244/3.28 |
| 4,296,894 A | 10/1981 | Schnabele et al. | |
| 4,336,914 A | 6/1982 | Thomson | |
| 4,354,646 A * | 10/1982 | Raymer | B64C 5/10 |
| | | | 244/47 |
| 4,364,530 A | 12/1982 | Ripley-Lotee et al. | |
| 4,364,531 A | 12/1982 | Knoski | |
| 4,373,688 A | 2/1983 | Topliffe | |
| 4,408,538 A | 10/1983 | Deffayet et al. | |
| 4,410,151 A | 10/1983 | Hoppner et al. | |
| 4,541,593 A | 9/1985 | Cabrol | |
| 4,565,340 A | 1/1986 | Bains | |
| 4,590,862 A | 5/1986 | Grabarek et al. | |
| 4,664,338 A | 5/1987 | Steuer et al. | |
| 4,708,304 A | 11/1987 | Wedertz et al. | |
| 4,730,793 A | 3/1988 | Thurber, Jr. et al. | |
| 4,735,148 A | 4/1988 | Holtzman et al. | |
| 4,841,867 A | 6/1989 | Garrett | |
| 4,842,218 A | 6/1989 | Groutage et al. | |
| 4,869,442 A * | 9/1989 | Miller | F42B 10/14 |
| | | | 244/3.28 |
| 4,903,917 A | 2/1990 | Peller et al. | |
| 4,958,571 A | 9/1990 | Puckett | |
| 4,964,593 A | 10/1990 | Kranz | |
| D317,003 S * | 5/1991 | Tribe | D12/16.1 |
| 5,074,493 A | 12/1991 | Greenhalgch | |
| 5,108,051 A | 4/1992 | Montet et al. | |
| 5,115,711 A | 5/1992 | Bushagour et al. | |
| 5,118,052 A * | 6/1992 | Alvarez | B64C 1/30 |
| | | | 244/49 |
| 5,141,175 A | 8/1992 | Harris | |
| 5,154,370 A | 10/1992 | Cox et al. | |
| 5,322,243 A * | 6/1994 | Stoy | B64C 5/10 |
| | | | 244/3.24 |
| 5,370,032 A | 12/1994 | Reuche et al. | |
| 5,417,393 A | 5/1995 | Klestadt | |
| 5,458,042 A | 10/1995 | Cante | |
| 5,582,364 A * | 12/1996 | Trulin | F42B 10/14 |
| | | | 244/3.29 |
| 5,584,448 A * | 12/1996 | Epstein | B64C 13/24 |
| | | | 244/3.28 |
| 5,615,846 A | 4/1997 | Shmoldas et al. | |
| 5,671,899 A * | 9/1997 | Nicholas | B64C 3/40 |
| | | | 244/3.28 |
| 5,780,766 A * | 7/1998 | Schroppel | F42B 12/16 |
| | | | 102/308 |
| 5,806,791 A | 9/1998 | Hatalsky et al. | |
| 5,884,872 A | 3/1999 | Greenhalgh | |
| 5,899,410 A | 5/1999 | Garrett | |
| 5,965,836 A | 10/1999 | Rakov | |
| 5,978,970 A | 11/1999 | Bright | |
| D417,639 S * | 12/1999 | Carichner | D12/16.1 |
| 6,053,452 A | 4/2000 | Yamakawa et al. | |
| 6,056,237 A * | 5/2000 | Woodland | B64C 3/40 |
| | | | 244/3.15 |
| 6,073,879 A * | 6/2000 | Sokolovsky | F42B 10/143 |
| | | | 244/3.28 |
| 6,122,572 A | 9/2000 | Yavnai | |
| 6,126,109 A | 10/2000 | Barson et al. | |
| 6,168,111 B1 | 1/2001 | Kayser et al. | |
| 6,224,013 B1 * | 5/2001 | Chisolm | F42B 10/14 |
| | | | 244/3.27 |
| 6,314,886 B1 * | 11/2001 | Kuhnle | F42B 10/14 |
| | | | 244/3.2 |
| 6,392,213 B1 * | 5/2002 | Martorana | B64C 39/024 |
| | | | 244/13 |
| 6,418,870 B1 | 7/2002 | Lanowy et al. | |
| D461,159 S * | 8/2002 | Miralles | D12/319 |
| 6,467,733 B1 | 10/2002 | Young et al. | |
| 6,571,715 B1 * | 6/2003 | Bennett | F42B 10/38 |
| | | | 102/374 |
| 6,588,700 B2 | 7/2003 | Moore et al. | |
| 6,601,795 B1 * | 8/2003 | Chen | B64C 3/40 |
| | | | 244/39 |
| 6,698,688 B1 | 3/2004 | Jones | |
| 6,722,252 B1 | 4/2004 | O'Dwyer | |
| 6,745,979 B1 | 6/2004 | Chen | |
| 6,748,871 B2 | 6/2004 | Hellman | |
| 6,923,404 B1 | 8/2005 | Liu et al. | |
| 6,978,970 B2 * | 12/2005 | Purcell, Jr. | B64C 3/56 |
| | | | 244/49 |

(56) References Cited

U.S. PATENT DOCUMENTS

| | | | |
|---|---|---|---|
| 7,083,140 B1* | 8/2006 | Dooley | F42B 10/14 |
| | | | 102/501 |
| 7,093,791 B2 | 8/2006 | Kusic | |
| 7,185,846 B1 | 3/2007 | Bittle et al. | |
| 7,216,429 B2 | 5/2007 | Logan et al. | |
| 7,299,130 B2 | 11/2007 | Mulligan et al. | |
| 7,338,010 B2* | 3/2008 | Corder | B64C 3/56 |
| | | | 244/3.24 |
| 7,343,232 B2 | 3/2008 | Duggan et al. | |
| 7,559,505 B2 | 7/2009 | Janka | |
| 7,584,925 B2* | 9/2009 | Miller | B64C 39/024 |
| | | | 244/3.28 |
| 7,793,606 B2 | 9/2010 | Olivier et al. | |
| 7,816,635 B2 | 10/2010 | Fink | |
| 7,841,559 B1* | 11/2010 | O'Shea | B64C 39/024 |
| | | | 244/219 |
| 7,854,410 B2* | 12/2010 | Fanucci | B64C 39/024 |
| | | | 244/139 |
| 7,883,051 B2 | 2/2011 | Sammy | |
| 7,900,869 B2 | 3/2011 | Keßler et al. | |
| 7,934,456 B1 | 5/2011 | Heitmann et al. | |
| 8,089,034 B2* | 1/2012 | Hammerquist | B64C 3/56 |
| | | | 244/3.27 |
| 8,109,212 B2 | 2/2012 | O'Dwyer | |
| 8,424,233 B2 | 4/2013 | Cronin et al. | |
| 8,438,977 B2* | 5/2013 | Paulic | F42B 5/035 |
| | | | 102/399 |
| 8,439,301 B1 | 5/2013 | Lussier et al. | |
| 8,444,082 B1* | 5/2013 | Foch | B64C 3/10 |
| | | | 244/49 |
| 8,887,641 B1 | 11/2014 | Manole et al. | |
| 8,985,504 B2* | 3/2015 | Tao | B64C 3/44 |
| | | | 244/3.28 |
| 9,108,713 B2* | 8/2015 | Tao | B64C 11/00 |
| 9,127,908 B2 | 9/2015 | Miralles | |
| 9,187,184 B2 | 11/2015 | Miralles et al. | |
| 9,703,295 B1 | 7/2017 | Neal et al. | |
| D813,761 S | 3/2018 | Balaresque et al. | |
| 10,042,360 B2* | 8/2018 | Nicoloff | F41G 7/30 |
| 10,222,177 B2 | 3/2019 | Miralles | |
| 10,494,093 B1 | 12/2019 | Miralles | |
| 10,583,910 B2* | 3/2020 | Tao | B64C 9/18 |
| 10,696,375 B2 | 6/2020 | Miralles et al. | |
| 2003/0006340 A1* | 1/2003 | Harrison | B64C 29/0075 |
| | | | 244/12.3 |
| 2003/0094536 A1* | 5/2003 | LaBiche | B60F 5/02 |
| | | | 244/2 |
| 2003/0173459 A1* | 9/2003 | Fanucci | B64C 5/12 |
| | | | 244/123.2 |
| 2003/0178527 A1* | 9/2003 | Eisentraut | F42B 10/14 |
| | | | 244/3.28 |
| 2004/0011919 A1* | 1/2004 | Johnsson | F42B 10/16 |
| | | | 244/3.29 |
| 2004/0030449 A1 | 2/2004 | Solomon | |
| 2004/0200375 A1 | 10/2004 | Kautzsch et al. | |
| 2004/0217230 A1 | 11/2004 | Fanucci et al. | |
| 2005/0004723 A1 | 1/2005 | Duggan et al. | |
| 2005/0011397 A1 | 1/2005 | Eches | |
| 2005/0178898 A1 | 8/2005 | Yuen | |
| 2005/0218260 A1* | 10/2005 | Corder | B64C 3/56 |
| | | | 244/49 |
| 2005/0258306 A1 | 11/2005 | Barocela et al. | |
| 2005/0274845 A1* | 12/2005 | Miller | B64C 39/024 |
| | | | 244/49 |
| 2006/0074557 A1 | 4/2006 | Mulligan et al. | |
| 2006/0255205 A1* | 11/2006 | Gleich | B64C 39/024 |
| | | | 244/49 |
| 2007/0018033 A1* | 1/2007 | Fanucci | F42B 10/143 |
| | | | 244/3.27 |
| 2007/0125904 A1* | 6/2007 | Janka | F42B 10/14 |
| | | | 244/3.28 |
| 2007/0152098 A1* | 7/2007 | Sheahan, Jr. | B64C 3/56 |
| | | | 244/49 |
| 2008/0041221 A1 | 2/2008 | Gaigler | |
| 2008/0061188 A1 | 3/2008 | Morris et al. | |
| 2008/0078865 A1 | 4/2008 | Burne | |
| 2008/0087763 A1 | 4/2008 | Sheahan et al. | |
| 2008/0093501 A1* | 4/2008 | Miller | B64C 39/024 |
| | | | 244/49 |
| 2008/0243371 A1 | 10/2008 | Builta et al. | |
| 2009/0100995 A1 | 4/2009 | Fisher | |
| 2009/0242690 A1 | 10/2009 | Sammy | |
| 2009/0302151 A1 | 12/2009 | Holmes | |
| 2010/0012774 A1* | 1/2010 | Fanucci | B64C 39/024 |
| | | | 244/49 |
| 2010/0025543 A1* | 2/2010 | Kinsey | B64C 29/02 |
| | | | 244/7 A |
| 2010/0212479 A1 | 8/2010 | Heitmann | |
| 2010/0264260 A1* | 10/2010 | Hammerquist | B64C 3/56 |
| | | | 244/49 |
| 2010/0282917 A1* | 11/2010 | O'Shea | B64C 39/024 |
| | | | 244/218 |
| 2011/0035149 A1 | 2/2011 | McAndrew et al. | |
| 2011/0146525 A1 | 6/2011 | Caillat | |
| 2011/0155840 A1* | 6/2011 | Lind, Jr. | B60F 3/00 |
| | | | 244/13 |
| 2011/0226174 A1* | 9/2011 | Parks | B60F 5/02 |
| | | | 114/313 |
| 2011/0308418 A1* | 12/2011 | Paulic | F42B 5/035 |
| | | | 102/399 |
| 2011/0315817 A1 | 12/2011 | Miralles et al. | |
| 2012/0000390 A1 | 1/2012 | Heitmann | |
| 2012/0068002 A1* | 3/2012 | Unger | F42B 10/64 |
| | | | 244/3.28 |
| 2012/0205488 A1 | 8/2012 | Powell et al. | |
| 2012/0267473 A1* | 10/2012 | Tao | B64C 3/44 |
| | | | 244/38 |
| 2015/0008280 A1 | 1/2015 | Smoker | |
| 2015/0053193 A1 | 2/2015 | Pruett et al. | |
| 2016/0121992 A1 | 5/2016 | Saroka et al. | |
| 2016/0214705 A1 | 7/2016 | Walker et al. | |
| 2017/0144749 A1* | 5/2017 | Tao | B64C 13/34 |
| 2017/0369150 A1 | 12/2017 | Finklea et al. | |
| 2020/0198761 A1* | 6/2020 | Tao | B64C 3/56 |

FOREIGN PATENT DOCUMENTS

| | | | | |
|---|---|---|---|---|
| CN | 2769834 Y | 4/2006 | | |
| CN | 101198520 A | 6/2008 | | |
| CN | 101495367 A | 7/2009 | | |
| GB | 2434783 A | * 8/2007 | | B64C 39/024 |
| GB | 2434783 A | 8/2007 | | |
| JP | 60188799 | 9/1985 | | |
| JP | 64-028096 | 1/1989 | | |
| JP | 1993106997 | 4/1993 | | |
| JP | 07089492 | 4/1995 | | |
| JP | H0789492 A | 4/1995 | | |
| JP | 09-026300 | 1/1997 | | |
| JP | 2001153599 A | 6/2001 | | |
| JP | 2001-206298 | 7/2001 | | |
| JP | 2003177000 A | 6/2003 | | |
| JP | 2008536736 A | 9/2008 | | |
| WO | 2005023642 A2 | 3/2005 | | |
| WO | 2009079045 A2 | 6/2009 | | |

OTHER PUBLICATIONS

Andreas Parsch; Coyote; Advanced Ceramics Research; 2006; <http://designation-systems.net/dusrm/app4/coyote.html>. (Year: 2006).*

European Search Report for EP Application No. EP 10833732, dated Jun. 1, 2015.

Non-Final Office action for U.S. Appl. No. 13/524,937 dated Apr. 24, 2014.

Restriction Requirement for U.S. Appl. No. 13/524,937 dated Dec. 5, 2013.

Notice of Allowance for U.S. Appl. No. 13/524,937 dated Nov. 20, 2014.

International Search Report for PCT/US2010/048323 dated Jun. 20, 2011.

(56) References Cited

OTHER PUBLICATIONS

Restriction Requirement for U.S. Appl. No. 13/318,459 dated Dec. 18, 2013.
Non-Final Office action for U.S. Appl. No. 13/318,459 dated Jun. 25, 2014.
Notice of Allowance for U.S. Appl. No. 13/318,459 dated Jan. 2, 2015.
Office action for Japanese Application No. 2016-023330 dated Aug. 1, 2017.
Canada Office action for Serial No. 2789726 dated Jun. 5, 2017.
Wikipedia, "Sabot", https://en.wikipedia.org/wiki/Sabot; archived on Feb. 24, 2011 by Internet Archive, https://web.archive.org/web/20100224075656/https://en.wikipedia.org/wiki/Sabot; accessed Oct. 10, 2018 (Year:2011).
IP.com Search Results (Year: 2020).

* cited by examiner

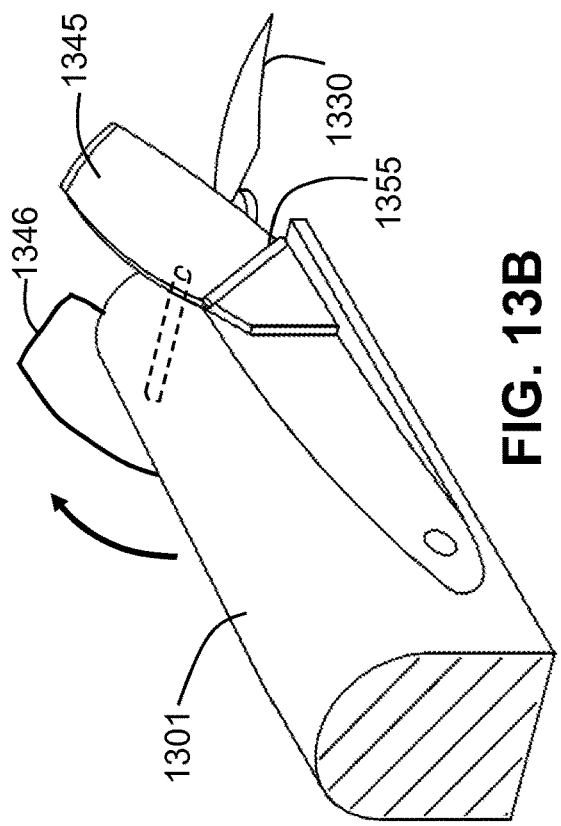
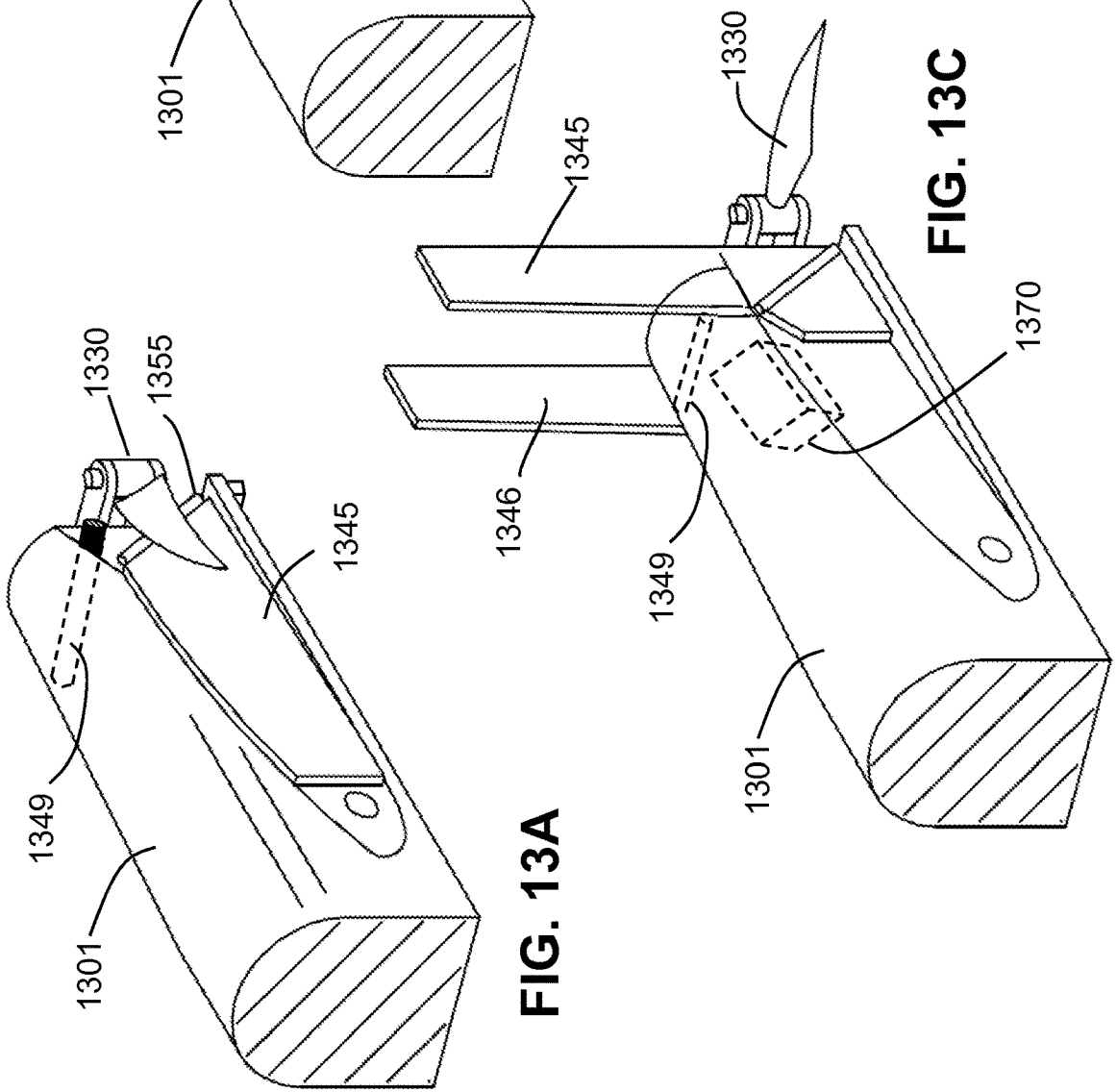
FIG. 13A
FIG. 13B
FIG. 13C

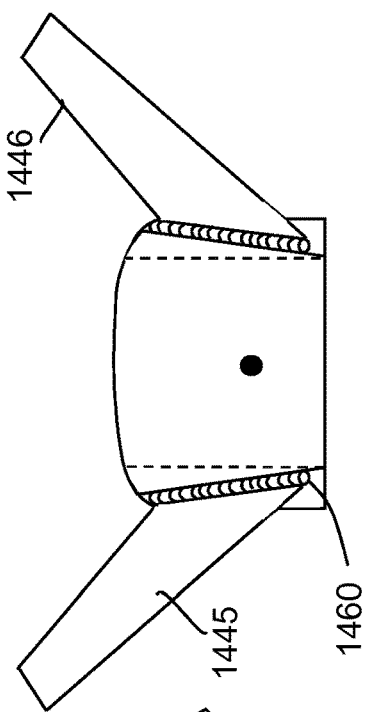
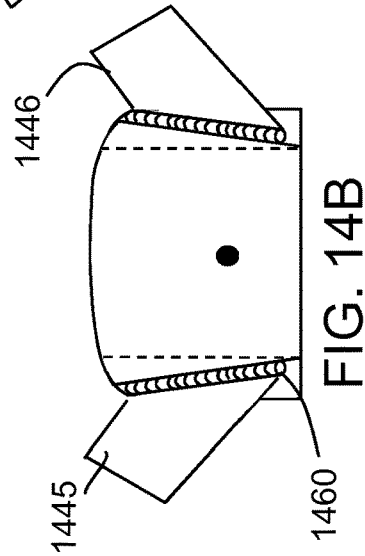
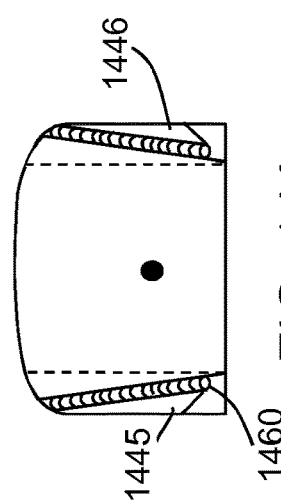
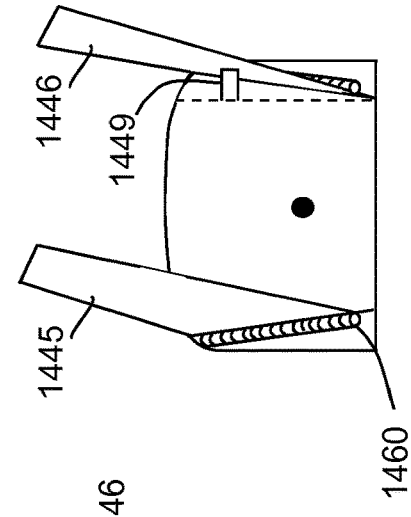
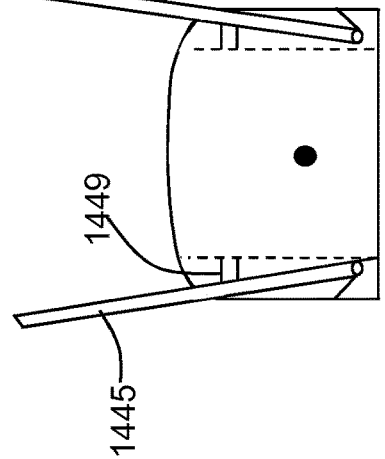
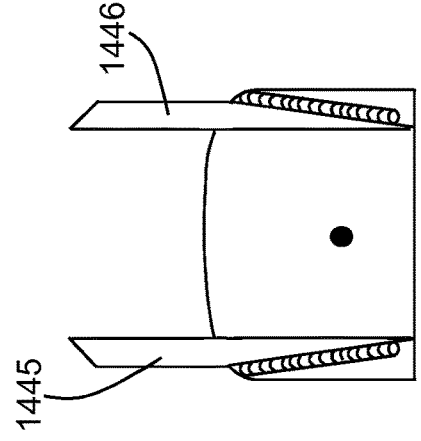

AIR VEHICLE SYSTEM HAVING DEPLOYABLE AIRFOILS AND RUDDER

This application is a continuation of U.S. patent application Ser. No. 13/524,937, filed Jun. 15, 2012, which is a continuation of U.S. patent application Ser. No. 13/318,459, filed Nov. 1, 2011, which is a U.S. National Stage Entry of PCT/US2010/048323 filed Sep. 9, 2010 which claims the benefit of U.S. Provisional Application No. 61/240,985 filed Sep. 9, 2009, the disclosures of all of which are hereby incorporated herein by reference in their entirety for all purposes.

TECHNICAL FIELD

Embodiments pertain to aerial vehicles, and to an aileron control system of aerial vehicles and/or unmanned aerial vehicles (UAVs).

BACKGROUND

The flight control of an aerial vehicle such as a UAV may be configured via combination of elevators, ailerons, rudders, and/or structural combinations: e.g., flaps and ailerons combined as flaperons; elevators and rudders combined as elevons, rudders and elevators combined as ruddervators. An airfoil for a UAV may include an actuator and a hinged flap that may be actuated about a hinge line to function as a control surface for a subsonic UAV.

DISCLOSURE

An aerial vehicle comprising a fuselage housing a first fuselage-mounted effector; a first airfoil comprising a first control surface resiliently mounted to the first airfoil, wherein the first control surface is opposed by the first fuselage-mounted effector; a second airfoil, rotatably attached to the fuselage housing; and a second fuselage-mounted effector disposed within the fuselage housing and extendible in part to engage the second airfoil. The air vehicle may be manned or unmanned. The air vehicle fuselage housing may comprise a third fuselage-mounted effector; and a third airfoil comprising a second control surface resiliently mounted to the third airfoil. Additionally, the air vehicle may comprise a fourth airfoil, rotatably attached to the fuselage housing. In other embodiments, the air vehicle fuselage housing having a third-fuselage-mounted effector; and a third airfoil comprising a second control surface resiliently mounted to the third airfoil may also comprise a mid-body, wherein the first airfoil and the third airfoil are disposed along the fuselage mid-body. In other embodiments, the fuselage may further comprise a tapered aft portion, wherein the second airfoil and the fourth airfoil are disposed along the tapered aft portion of the fuselage.

In some embodiments, a manned or unmanned aerial vehicle may comprise a fuselage housing a first fuselage-mounted effector, wherein the first fuselage-mounted effector is a first actuator horn extendible via a first fuselage aperture; a first airfoil comprising a first control surface resiliently mounted to the first airfoil, that may be a trailing edge of the first airfoil articulated at a lineal joint about the first airfoil, wherein the first control surface is opposed by the first fuselage-mounted effector; a second airfoil, rotatably attached to the fuselage housing; and a second fuselage-mounted effector disposed within the fuselage housing and extendible in part to engage the second airfoil. Additionally, the third fuselage-mounted effector may be a second actuator horn extendible via a second fuselage aperture, for example.

In another embodiment, a method of aerial vehicle flight control may comprise: providing a first resiliently mounted control surface opposed by a first fuselage-mounted actuator horn; and deflecting the first resiliently mounted control surface via the first fuselage-mounted actuator horn based on one or more command signals.

In another embodiment, an aerial vehicle may comprise: a fuselage, comprising a housing tapering aftward, wherein the aft portion of the fuselage tapers by an angle defined in part by the first airfoil; a first airfoil which may be resiliently mounted to the fuselage housing, and/or rotatably attached to the fuselage housing and/or mounted to the fuselage housing via a hinge; and an effector member disposed within the fuselage housing and extendible in part to engage the first airfoil. Additionally, the first airfoil may rotate around an axis and the axis of rotation may be canted relative to the longitudinal axis of the fuselage housing. This first airfoil may be responsive to a translation of the effector member, wherein the effector member is extendible laterally relative to the longitudinal axis of the fuselage housing and wherein the effector member is engaged by an actuator to effect the angular rotation of the first airfoil and the effector member may be further extendible from a fuselage aperture, wherein the effector member translates in a single axis.

In another embodiment, an aerial vehicle may comprise: a fuselage, comprising a housing tapering aftward, wherein the aft portion of the fuselage tapers by an angle defined in part by the first airfoil; a first airfoil which may be resiliently mounted to the fuselage housing, and/or rotatably attached to the fuselage housing and/or mounted to the fuselage housing via a hinge; and an effector member disposed within the fuselage housing and extendible in part to engage the first airfoil wherein the axis of rotation is about a hinge-line canted relative to the longitudinal axis of the fuselage housing and the first airfoil is responsive to the translation of the effector member. Additionally, the aerial vehicle effector member may be extendible laterally relative to the longitudinal axis of the fuselage housing, may be further extendible from a fuselage aperture, may translate in a single axis, and may be engaged by an actuator to effect the angular rotation of the first airfoil.

In another embodiment, a method of aerial vehicle flight control may comprise: providing a first resiliently mounted control surface opposed by a first fuselage-mounted actuator horn; and deflecting the first resiliently mounted control surface via the first fuselage-mounted actuator horn based on one or more command signals that may further comprise: a second airfoil, rotatably attached to the fuselage housing; wherein the second airfoil opposes the first airfoil; wherein the aft portion of the fuselage tapers by an angle defined further by the second airfoil; wherein the first airfoil and the second airfoil abut the opposing ends of the effector member; and wherein the effector member engages the first airfoil and the second airfoil. Additionally, the first airfoil and the second airfoil may move in cooperation with each other and/or may be resiliently mounted to the fuselage housing; wherein the axis of rotation of the first airfoil and second airfoil are canted relative to a longitudinal axis of the fuselage housing; wherein the first airfoil and the second airfoil are responsive to the translation of the effector member; wherein the effector member is extendible laterally relative to the longitudinal axis of the fuselage housing; wherein the effector member is engaged by an actuator to effect the angular rotation of the first airfoil and the second airfoil; wherein the effector member is further extendible from a fuselage aperture; and wherein the effector member translates in a single axis. Additionally, the first airfoil may be mounted to the fuselage housing via a hinge; wherein the axis of rotation is about a hinge-line canted relative to a longitudinal axis of the fuselage housing; wherein the first airfoil and the second airfoil are responsive to the translation of the effector member; wherein the effector member is extendible laterally relative to the longitudinal axis of the fuselage housing; wherein the effector member is engaged by an actuator to effect the angular rotation of the first airfoil and the second airfoil; wherein the effector member is further extendible from a fuselage aperture; and wherein the effector member translates in a single axis.

BRIEF DESCRIPTION OF THE DRAWINGS

Embodiments are illustrated by way of example and not limitation in the figures of the accompanying drawings, and in which:

FIG. 13A is a side angle view of a tapered aft portion of an air vehicle depicting an exemplary pre-deployment position of a rudder surface;

FIG. 13B is a side angle view of a tapered aft portion of an air vehicle depicting an exemplary mid-deployment position of the rudder surfaces;

FIG. 13C is a side angle view of a tapered aft portion of an air vehicle depicting an exemplary post-deployment position of the rudder surfaces;

FIG. 14A is a back view of a tapered aft portion of an air vehicle depicting the rudders as being in the folded state;

FIG. 14B is a back view of a tapered aft portion of an air vehicle depicting the rudders as being in the beginning stages of deployment;

FIG. 14C is a back view of a tapered aft portion of an air vehicle depicting the rudders as they are in the middle of deployment;

FIG. 14D is a back view of a tapered aft portion of an air vehicle depicting the rudders at they are finishing their deployment;

FIG. 14E is a back view of a tapered aft portion of an air vehicle depicting the rudders standing against the fuselage wall and fully deployed;

FIG. 14F is a back view of a tapered aft portion of an air vehicle depicting the rudders being engaged by the actuator rod;

BEST MODES

Figure 1:
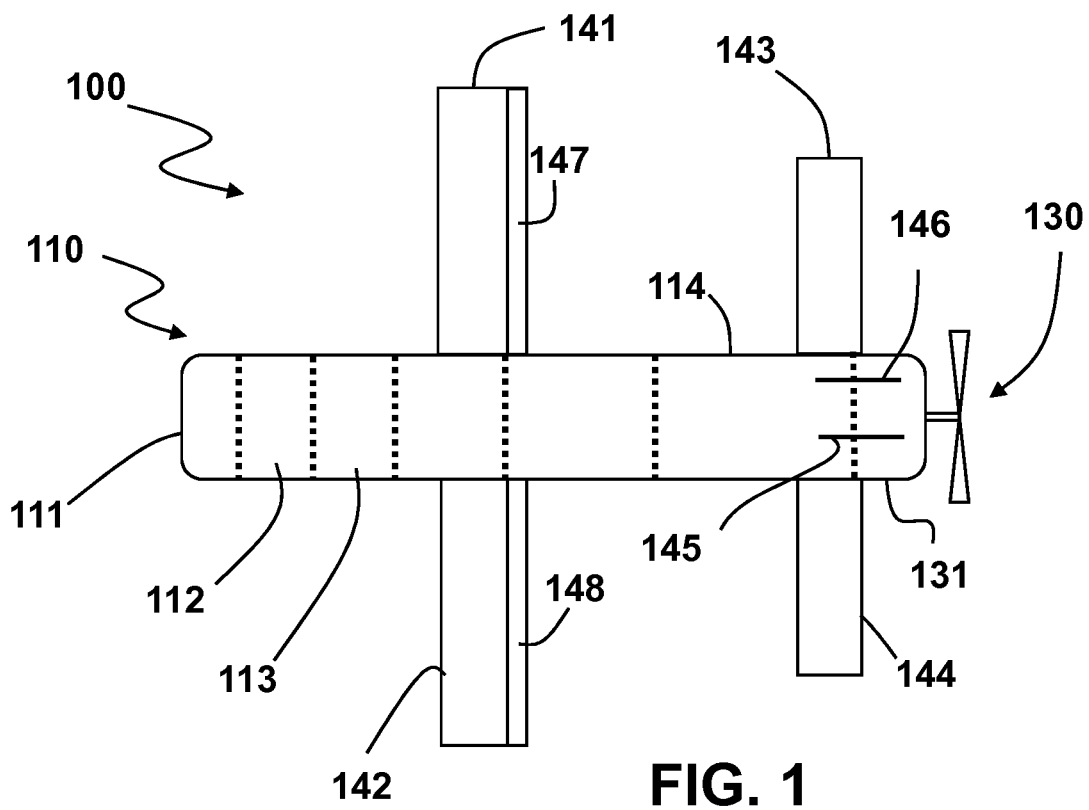
FIG. 1 is a plan view of an air vehicle embodiment.

Reference is made to the drawings that illustrate exemplary embodiments. FIG. 1 illustrates a top view of an exemplary embodiment of the UAV portion 100 of the present invention. The exemplary UAV comprises a front end 110 having a homing sensor 111, e.g., a pixel array for sensing visible and/or infrared light, and deployable payload 112, e.g., a warhead or other attack munitions, a deployable electronic subassembly, and a pigmenting capsule. The front end 110 may also include an electronics assembly (EA) 113, or avionics, that may include a guidance processor comprising guidance instructions that, when executed, take in information pertaining to the UAV position, linear and/or rotational velocities, linear accelerations and/or attitude, and generate commands for either or both autopilot processing and/or engine control processing or remote human pilot processing. The UAV may comprise one or more power sources 114, such as battery units or fuel cells and power conditioning circuits. The UAV may include vehicle-specific sensors, e.g., a GPS antenna and GPS receiver, e.g., as part of the EA and/or attitude and/or rate gyroscopes and/or linear accelerometers that may be proximate to the EA and/or vehicle center of gravity. The UAV may include mode of thrust generation, such as a propeller 130 and a propeller motor 131, and other embodiments may use, separately or in combination, turbine motors and/or rocket motors. The UAV may have lifting surfaces such as wing 141,142, tail 143,144 and rudder surfaces 145,146. The wing surfaces may have actuated control panels 147,148, operating as elevons, or may be embodied as wings as elevators and the tail surfaces may have actuated control panels, operating as ailerons. The UAV may be statically stable in yaw, and may be augmented by articulated trailing sections of the one or more rudder surfaces. Some embodiments of the UAV may have a two-rudder assembly mounted on a rotatable platform that may be conformal to the UAV fuselage to effect an augmentation in yaw control.

Figure 2:
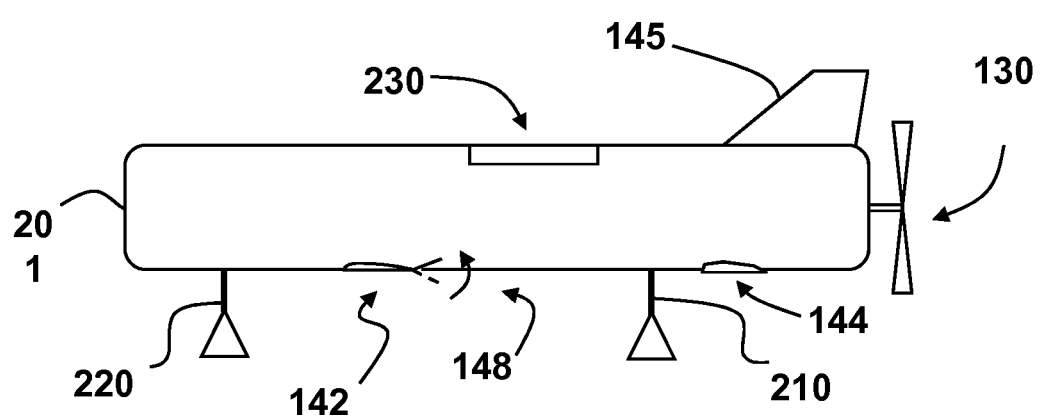
FIG. 2 is a side elevational view of the air vehicle embodiment.

FIG. 2 shows in side view the exemplary UAV where the wing 142 is shown with the trailing control surface 148 in motion and with two antenna wires (not to scale) extending from the fuselage 201. One antenna element may be used as an uplink 210, particularly for receiving a mode control signal that effects a transition from a terminal homing mode to a surveillance/reconnaissance, or loiter, mode or a transition from surveillance to a homing mode. Another antennal element may be used as a downlink 220 for transmitting data such as live video, automatic video tracking status, flight parameters, and/or UAV states. A GPS antenna 230 may be mounted conformably or within the fuselage, i.e., behind the skin of the fuselage when made of material largely transparent (low loss) in the GPS frequency bands. Generally, the GPS antenna may be mounted to be capable of receiving signals from a GPS satellite constellation.

Figure 3:
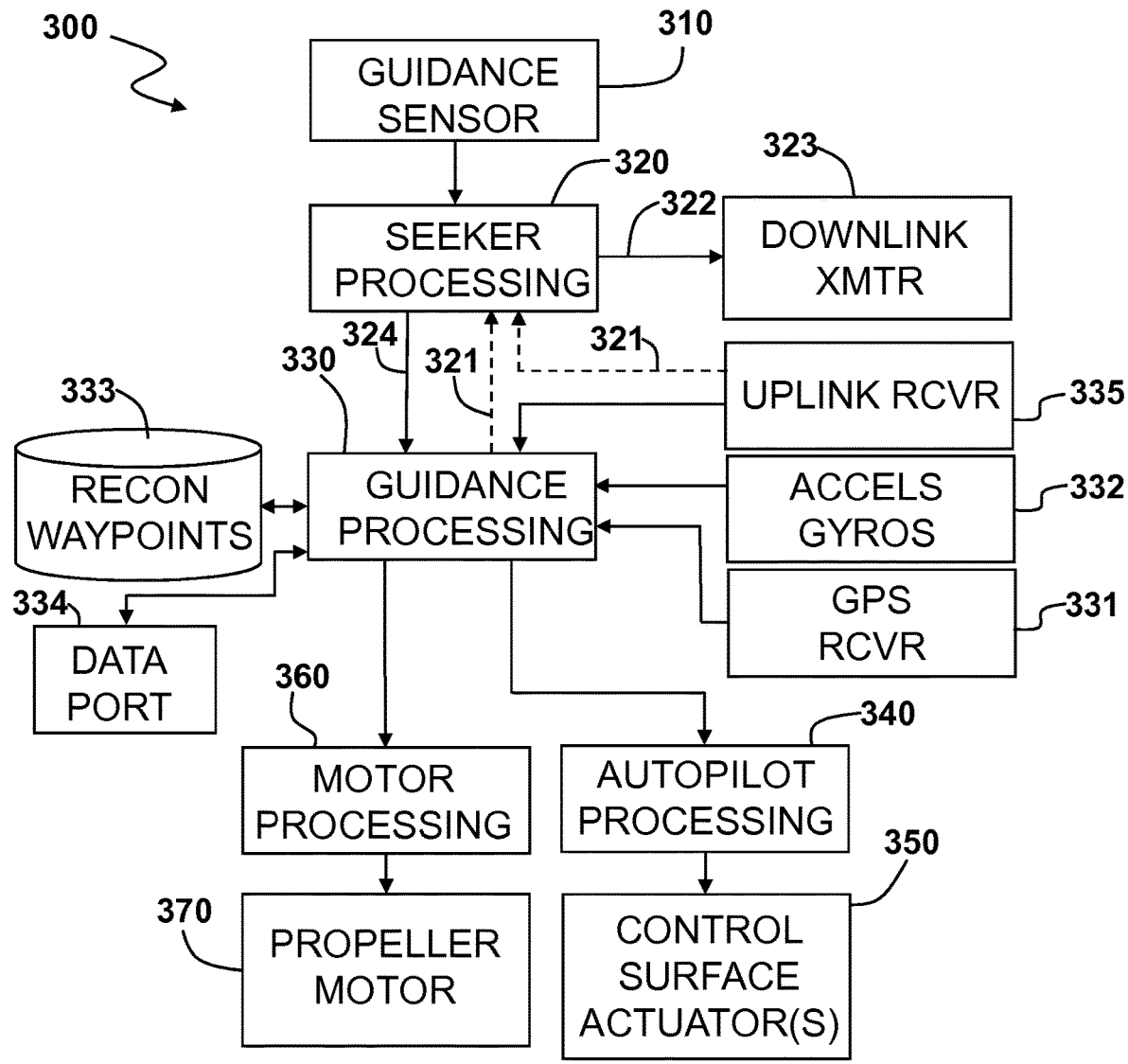
FIG. 3 is a top level functional block diagram of a system architecture embodiment.

FIG. 3 shows an exemplary functional block diagram of the UAV processing and guidance and control subsystem 300 where the guidance sensor 310 provides information about the external environment pertaining to seeking processing of a seeker processor 320. A guidance sensor, and more generally, a guidance sensor suite, may include a passive and/or active radar subsystem, an infrared detection subsystem, an infrared imaging subsystem, a visible light imaging subsystem such as a video camera-based subsystem, an ultraviolet light detection subsystem, and combinations thereof. The seeker processor 320 may include both image processing and target tracking processing, and target designation or re-designation input 321 that may be received from an uplink receiver 335 and/or as an output of a guidance process 330. The image processing and/or target tracking information 322 may be transmitted via a downlink transmitter 323, which may be a part of an uplink/downlink transceiver. The guidance processor 330, in executing instructions for guidance processing, may take in the target information 324 from the seeker processing 320, and UAV flight status information such as position, velocity and attitude from the GPS receiver 331, and gyroscopes and accelerometers 332, if any. The guidance processor 330, to receive reconnaissance waypoints and/or surveillance optimizing trajectories, may reference a memory store 333. For system embodiments, the guidance process 330 may receive, by way of an external data port 334, e.g., during a pre-launch phase, or by way of an uplink receiver 335, e.g., during a post-launch phase, receive and/or upload reconnaissance waypoints and/or surveillance optimizing trajectories. The guidance processor 330, as part of executing instructions for determining flight path, a trajectory, or a course steering angle and direction, may reference the waypoint and/or surveillance optimizing trajectory information, particularly when not in a terminal homing mode. The guidance processor 330 may receive a command via an uplink receiver 335 to switch or otherwise transition from a terminal homing mode to a surveillance mode, i.e., non-terminal homing mode, and switch from a surveillance mode to a terminal homing mode. For example, a visual target lock by the seeker processing 330 may be tracked with reference to GPS coordinates and integrated into a terminal homing solution iteratively determined by the guidance processor executing instructions pertaining to determining a revisable terminal solution.

An example of a terminal homing mode may be proportional navigation with a gravity bias for strike sub-modes of the terminal homing mode, and an acceleration bias for aerial intercept sub-modes of the terminal homing mode. The guidance processing 330 and autopilot processing 340 may execute instruction to effect a bank-to-turn guidance, for example, in an elevon embodiment, to redirect the air vehicle by reorienting its velocity vector. For example, one or more control surfaces may be reoriented via one or more control surface actuators 350 causing forces and torques to reorient the air vehicle and the portion of its linear acceleration that is orthogonal to its velocity vector. The portion of the linear acceleration of the air vehicle that is along the velocity vector is greatly affected by aerodynamic drag, and the linear acceleration may be increased via a motor processor 360 and a propeller motor 370. For embodiments with full three-axis control, additional control topologies may be implemented including skid-to-turn and other proportion-integral-differential guidance and control architectures as well. The seeker processing, guidance processing, motor processing, and/or autopilot processing may be executed by a single microprocessor having addressable memory and/or the processing may be distributed to two or more microprocessors in distributed communication, e.g., via a data bus.

Figure 4:
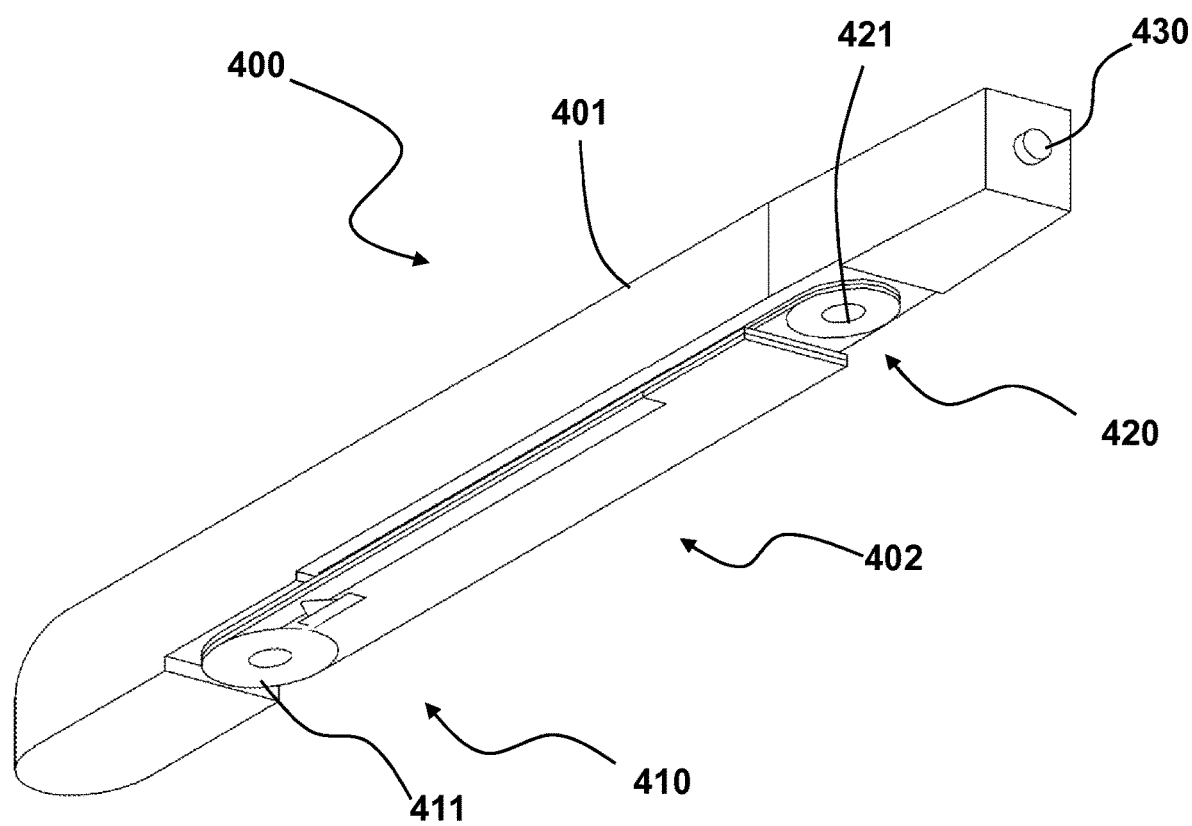
FIG. 4 is a bottom perspective view of an embodiment in a retracted state.

FIG. 4 illustrates in a bottom perspective view an exemplary air vehicle 400 embodiment having a first pair of airfoils in a retracted position and a second pair of airfoils in a retracted position disposed on a bottom portion 402 of the fuselage 401 of the air vehicle 400. Also shown in FIG. 4 is an exemplary propeller hub 430. To rotate into a deployed position, a first exemplary pair of airfoils 410 that may pivot about a forward pivot point 411 and a second exemplary pair of airfoils 420 that may pivot about an aft pivot point 421. In certain embodiments, the retracted positions of the airfoil allow the air vehicle to be stored prior to deployment and/or for other uses and convenient transport.

Figure 5:
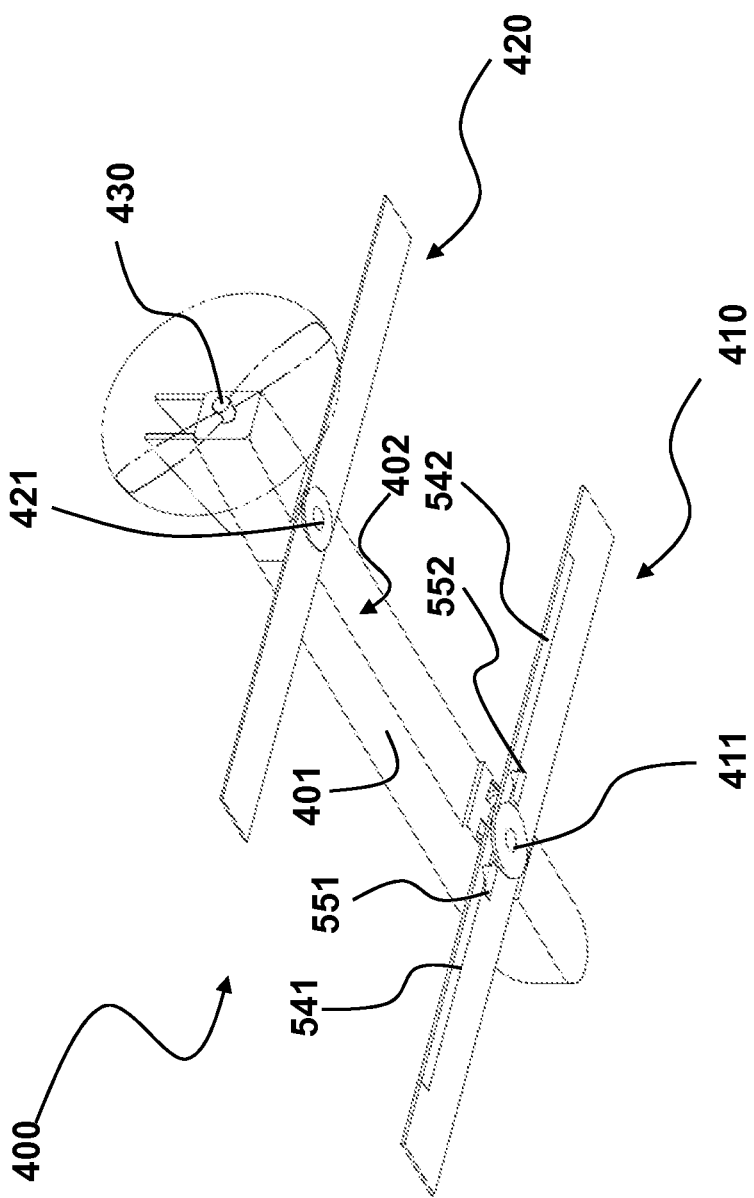
FIG. 5 is a bottom perspective view of an embodiment in a deployed state.

FIG. 5 illustrates in a bottom perspective view an exemplary air vehicle embodiment having two pairs of airfoils 410,420 in a deployed position. The exemplary forward pair of airfoils 410 is depicted as each having articulated trailing edge portions 541,542 and bottom-mounted resilient elements 551,552.

Figure 6:
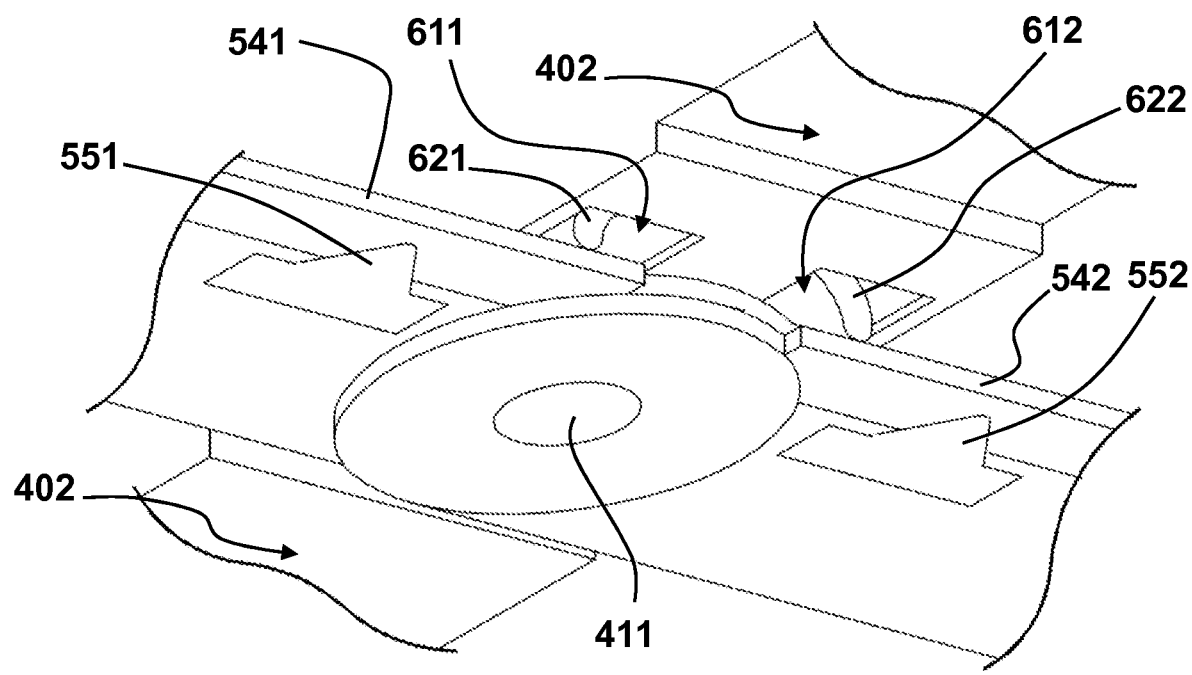
FIG. 6 is a bottom perspective view of an embodiment of the present invention in a deployed state depicting contact by an extending starboard horn and a deflecting trailing edge.

FIG. 6 illustrates another bottom perspective view of the exemplary air vehicle 400 embodiment where the fuselage 401, particularly in this illustration the bottom portion 402, is shown having a port aperture 611 and a starboard aperture 612 from which an actuating horn 621,622 protrudes from each aperture. The bottom side of the airfoil-trailing edge region proximate to the fuselage for both forward airfoils is each depicted as having a resilient or flexible fixture 551, 552.

Figure 7A:
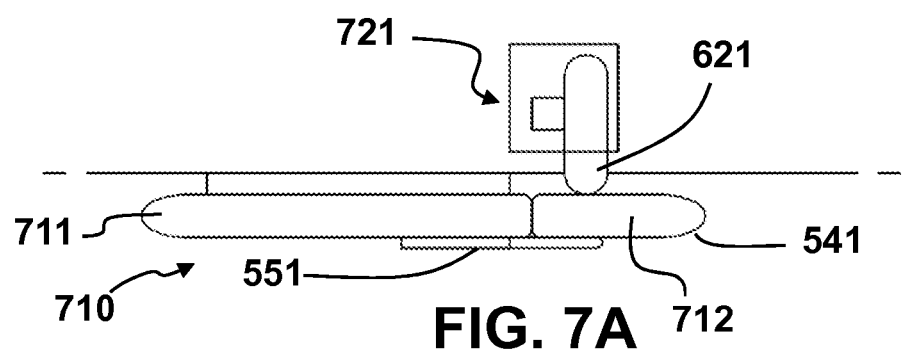
FIG. 7A depicts a side view of the port airfoil-trailing edge region of an embodiment of the present invention illustrating a horn of the port actuator that has been actuated to contact the top surface of the port trailing edge.
Figure 7B:
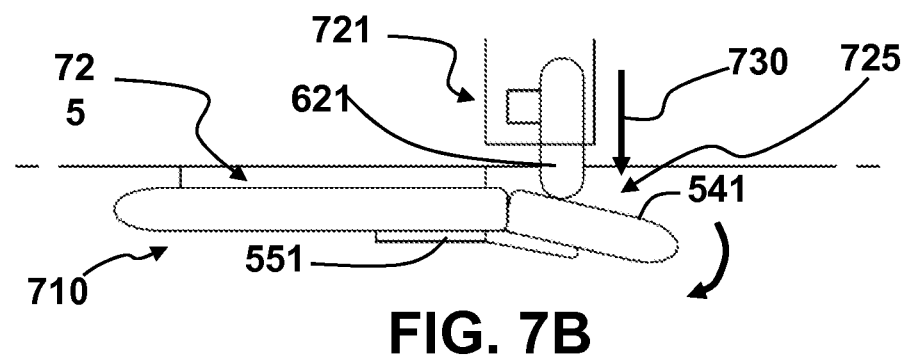
FIG. 7B depicts a side view of the port airfoil-trailing edge region of an embodiment of the present invention illustrating a horn of the port actuator actuated to deflect angularly the top surface of a port trailing edge relative to a top surface of the port airfoil.
Figure 7C:
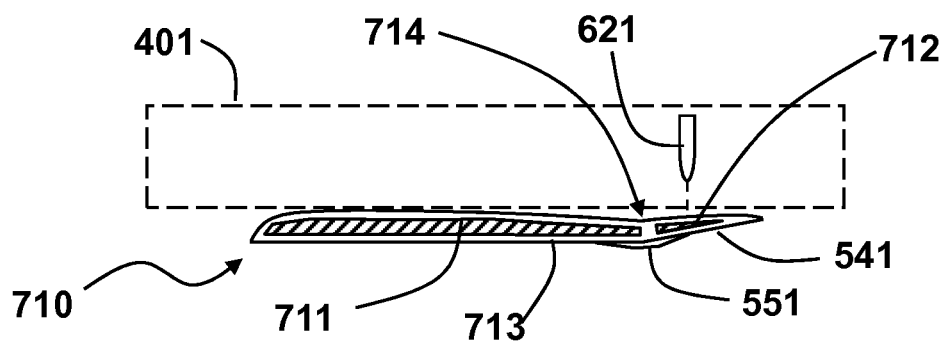
FIG. 7C depicts a cross-sectional view of an airfoil an elevated trailing edge produced by an unopposed resilient element.
Figure 7D:
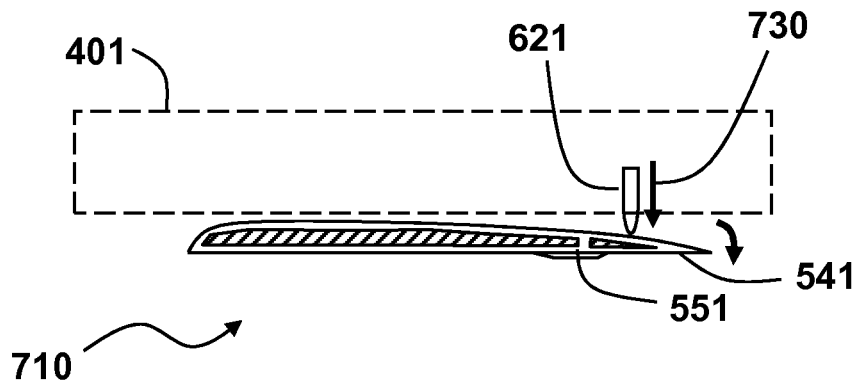
FIG. 7D depicts a cross-sectional view of an airfoil an in-line trailing edge produced by a fuselage-based actuator horn extending to oppose the resilient element.
Figure 7E:
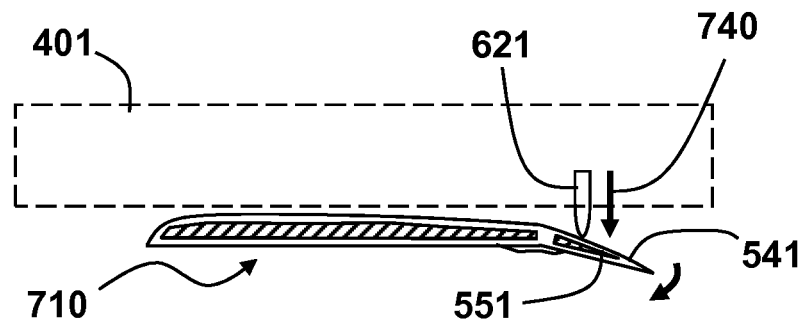
FIG. 7E depicts a cross-sectional view of an airfoil a deflected trailing edge produced by an fuselage-based actuator horn further extending to oppose the resilient element.

FIG. 7A depicts a side view the port airfoil-trailing edge region where the horn 621 of the port actuator 721 has been actuated to contact the top surface of the port trailing edge 541. An exemplary airfoil 710 may comprise two internal structural elements, e.g., a main lifting structural planar element 711 and a control surface structural element 712. FIG. 7B depicts a side view the port airfoil-trailing edge region where the horn of the port actuator has been actuated 730 to deflect angularly the top surface of the port trailing edge 541 relative to the top surface of the port airfoil 725. FIG. 7C depicts, in a cross-sectional view of an airfoil 710, an elevated trailing edge 541 produced by an unopposed resilient element 551. A coating 713 may be disposed about the two exemplary structural elements 711,712 and may fill the lineal gap 714 between the lifting surface 711 and the control surface 712 elements. The coating material thereby may define the planform of the airfoil 710, and may be selected from materials such as resins, plastics, and synthetic rubbers, to provide in part, flexure along the lineal gap and provide for substantially laminar flow in low sub-subsonic flight conditions. FIG. 7D depicts a cross-sectional view of the airfoil 710, an in-line trailing edge 541 produced by a fuselage-based actuator horn 621 extending 730 to oppose the resilient element 551. FIG. 7E depicts a cross-sectional view of the airfoil 710, a deflected trailing edge 541 produced by an fuselage-based actuator horn 621 further extending 740 to oppose the resilient element 551. A similar arrangement may be applied to leading edge control surfaces, instead of, or in addition to the illustrative trailing edge control surfaces. Likewise, the aft pair of airfoils may include trailing edge control surfaces and fuselage-based extendable actuator horns.

Figure 8A:
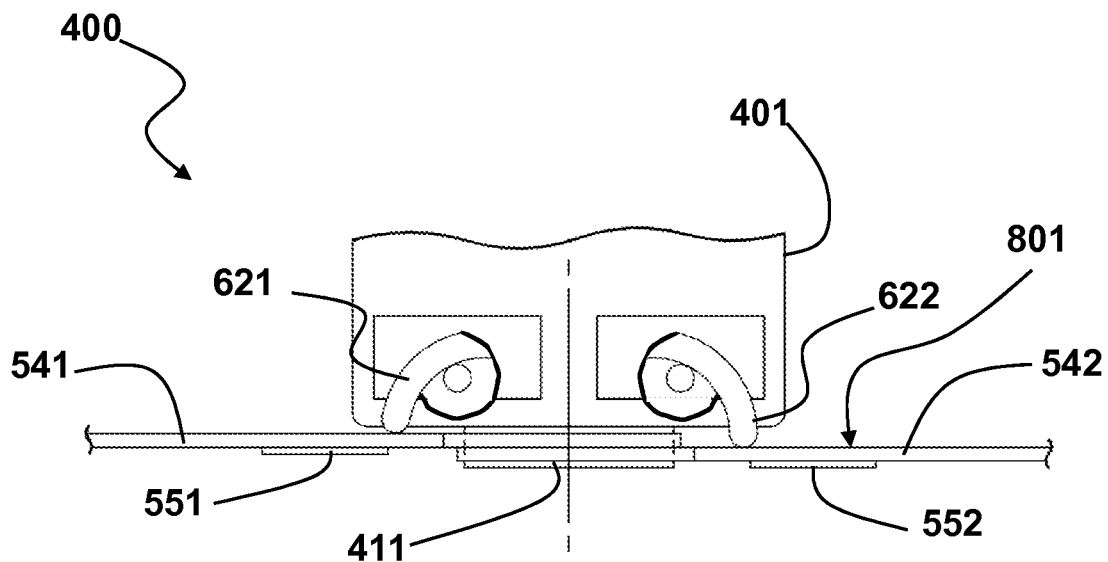
FIG. 8A depicts a cross-sectional view of an embodiment, aft of the actuator horns and looking forward, a starboard actuator horn in contact with the starboard trailing edge relative to the top of the starboard airfoil.
Figure 8B:
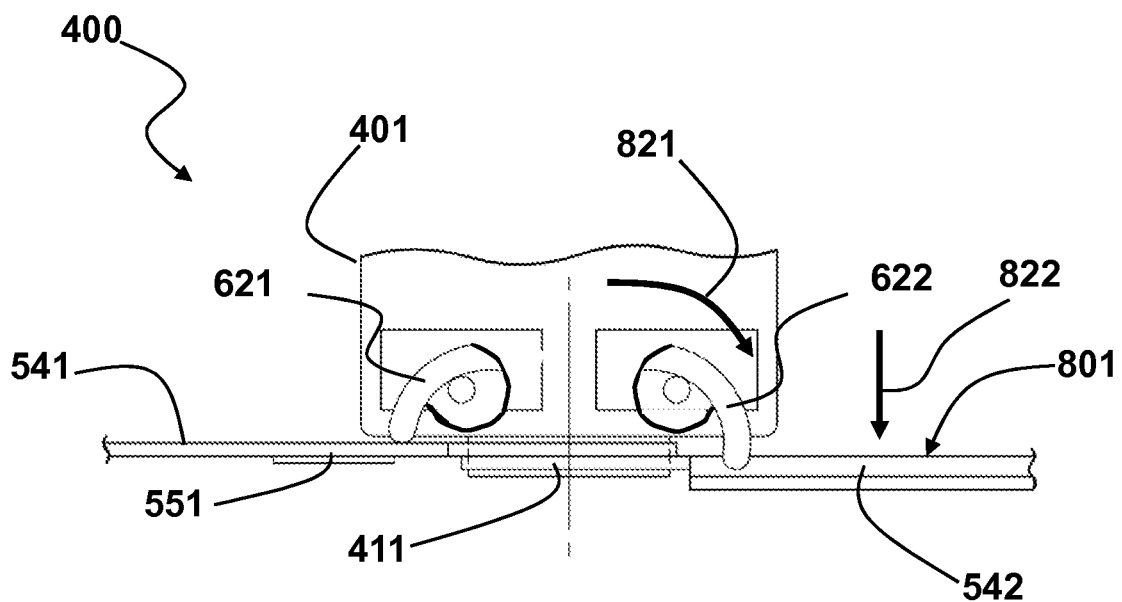
FIG. 8B depicts a cross-sectional view of an embodiment, aft of the actuator horns and looking forward, a deflection of the starboard trailing edge relative to the top of the starboard airfoil.

FIG. 8A depicts a cross-sectional view, aft of the actuator horns 621,622 and looking forward, a starboard actuator horn 622 in contact with the starboard trailing edge 542 relative to the top of the starboard airfoil 801. FIG. 8B depicts a cross-sectional view, aft of the actuator horns 621,622 and looking forward, a deflection 822 of the starboard trailing edge 542 relative to the top of the starboard airfoil 801 in response to the rotation 821 of the starboard actuator horn 622.

Figure 9:
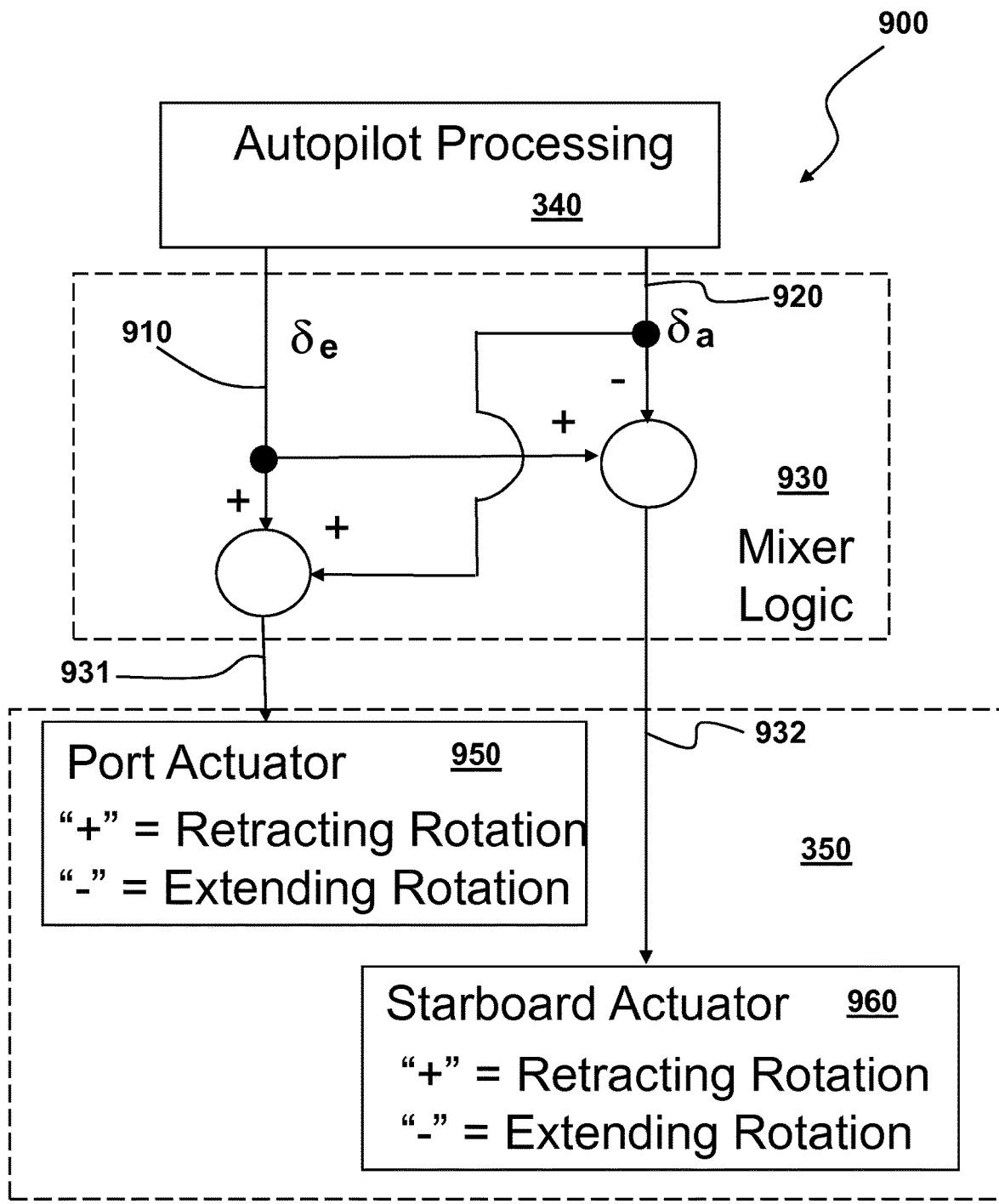
FIG. 9 depicts a functional block diagram where an elevator command and aileron command may be output and combined to provide commands to a port actuator and a starboard actuator.

FIG. 9 depicts a functional block diagram 900 where, from autopilot processing 340, an elevator command 910, $\delta_e$, and aileron command 920, $\delta_a$, may be output as voltage commands and combined according to mixer logic 930 to provide a port actuator command 931 and a starboard actuator command 932. The mixer logic 930 may be embodied as part of the autopilot processing or embodied as a separate module or circuit. A port actuator 950 may be configured where positive voltages drive the port actuator horn in a retracting direction and negative voltages drive the port actuator horn in an extending direction. Likewise, a starboard actuator 960 may be configured where positive voltages drive the starboard actuator horn in a retracting direction and negative voltages drive the starboard actuator horn in an extending direction. The port actuator 950 and starboard actuator 960 may be configured with extension/retraction feedback that may further regulate and/or refine the actuator horn positioning. In some embodiments, the air vehicle may be configured where the trailing edges are initially deflected upward due to the rotational force provided by each of the respective resilient members. In an example, where the airfoils are disposed along the bottom of the fuselage and the top of the fuselage is oriented skyward, the trailing edge deflections may produce upward pitching moments that in turn may be reduced or brought to null, i.e., trim, by the rotational extension of each of the actuator horns. In some embodiments, linear actuators may replace the exemplary rotational actuators actuating the contact horns.

In addition to the actuatable control surfaces as set forth herein, e.g., the control panels 147,148, operating as elevons, embodiments may have additional such surfaces. These control surfaces may also be deployable to allow the UAV to be configured for storage, such as within a launch tube, or configured for operation, e.g., flight. The particular location(s) and/or orientations of such deployable control surfaces may vary depending on how the control surface(s) will effect movement of the vehicle about one or more of its degrees of freedom, e.g., a rudder to impart a yawing motion to the vehicle. As with the elevons 147,148, for each such additional actuatable control surface, one or more actuators are arranged so that after deployment of the control surface the actuator(s) will interact with the surface(s) to cause the desired actuation.

In embodiments the UAV includes a fuselage, where a deployable control surface assembly, e.g., a vertical stabilizer and/or rudder, is mounted at or near the aft portion of the UAV. The deployment of the control surface assembly may be achieved by a variety of means including sliding, pivoting, rotating, or the like, into position. Embodiments have a control surface assembly that rotates about a hinge having a spring positioned, such as about the hinge, so to impart a biasing force to urge the control surface assembly from its stored position to its operational position.

For example, the UAV may include one or more vertical stabilizers and/or rudders that rotate into position about an axis of rotation. Such control surfaces may be positioned along the tapered portion of the fuselage at the aft portion of the fuselage, wherein such tapering may be configured to retain the control surfaces and other components (such as a folded propeller) while in their stored position. After deployment from their stored position to their operational position, the rudders may be rotated and/or deflected by an effector member that may be disposed transversely within the fuselage housing and extendible in part to engage the rudders. The effector member may be driven by an actuator. Once engaged, the ends of the effector member abut the rudders by affixing, sticking, snapping or otherwise securing to the rudder surfaces as a result in part of the resilient tension and/or air pressure. The axis of rotation of the rudders may be a crease or a hinge for example—resiliently mounted or spring loaded—canted relative to a longitudinal axis of the UAV. The longitudinal axis of the UAV extends through the center of the fuselage from the nose to the tail, passing through the center of gravity of the UAV. Further, the rudders may be rotated and or deflected via an actuator, e.g., via a shaft or pushrod driven by an actuator. As such, a single hinge functions to both allow a rudder to rotate thereabout during deployment from the stored to the operational positions, as well as for the rudders to rotate thereabout, when after deployment, the rudder is moved or deflected by the actuator.

Figure 10A:
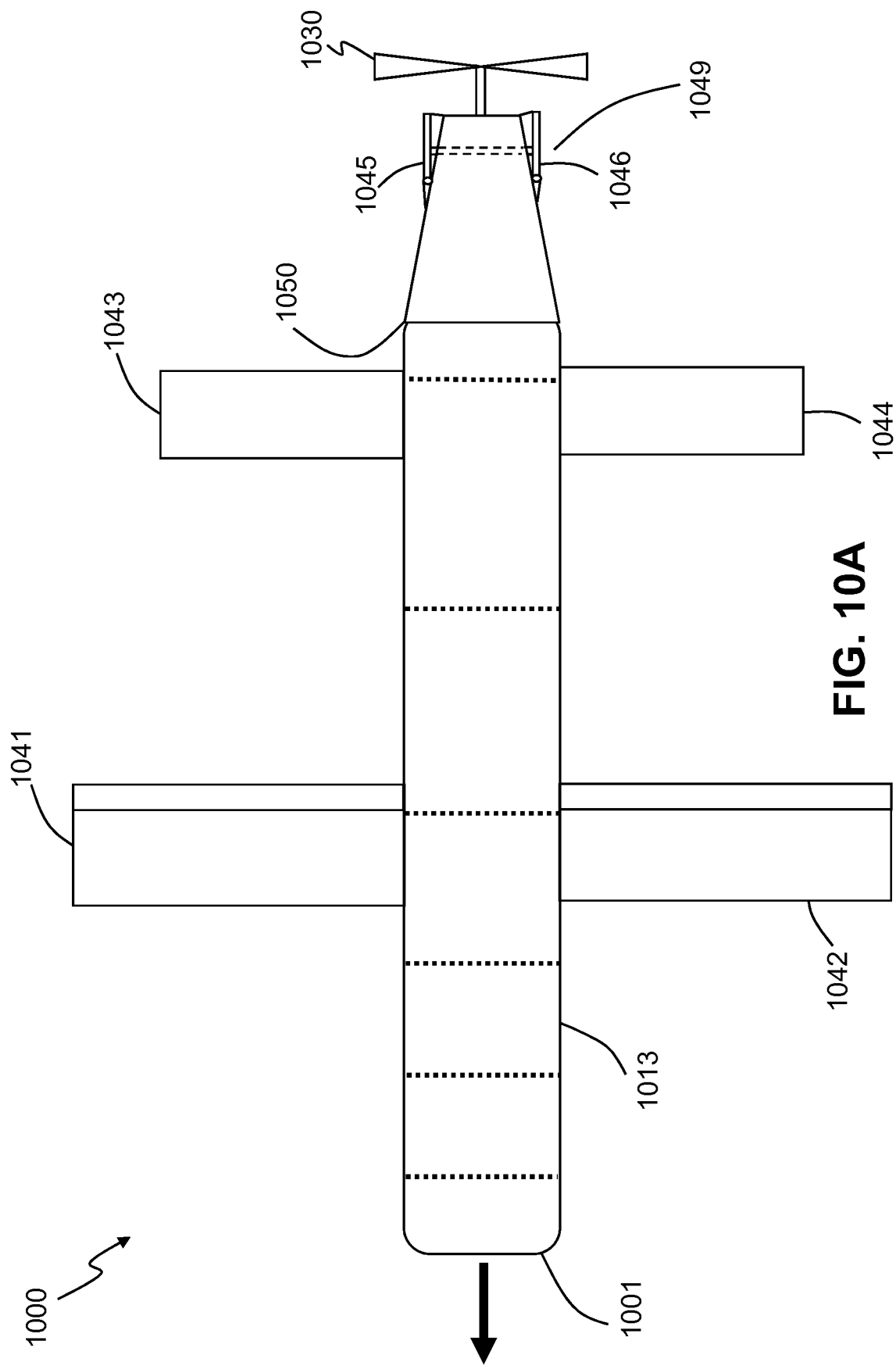
FIG. 10A depicts a top view of an embodiment showing the tapered aft portion of an air vehicle.

FIG. 10A illustrates a top view of an exemplary embodiment of the UAV portion 1000 of the present invention. The exemplary UAV comprises a fuselage 1001 which may include an electronics assembly (EA) 1013, or avionics, that may include a guidance processor comprising guidance instructions that, when executed, take in information pertaining to the UAV position, linear and/or rotational velocities, linear accelerations and/or attitude, and generate commands for either or both autopilot processing and/or engine control processing or remote human pilot processing. The UAV may include mode of thrust generation, such as a propeller 1030. The UAV may have lifting surfaces such as wing 1041,1042, tail 1043,1044, and rudder surfaces 1045, 1046. The fuselage 1001 in this embodiment contains a portion of the housing 1050 which tapers aftward. This tapering is configured to retain the control surfaces and the folded propeller while in stored positions. The rudder surfaces may counter the adverse yaw and may be used for control to stabilize, point and/or turn the UAV via an actuated control element 1049, which may for example be a rod or a curved horn rotatable about an actuator shaft. The UAV may be statically stable in yaw, however in the exemplary embodiment of FIG. 10A, the rudders 1045,1046 may vary the amount of lateral force generated by the tail surface, and accordingly the deflection of the rudders out of the wind stream may be used to generate and control the yawing motion of the UAV, e.g., to point the centerline of the UAV. That is, the rudder surfaces may be used to control the position of the nose of the UAV. The UAV turns are caused by banking the UAV to one side using either aileron or elevon. The banking may cause the flight path of the UAV to curve and therefore the rudder surfaces 1045,1046 may help to ensure the UAV is aligned with the curved flight path correctly and that the turn is coordinated. Otherwise, the UAV may encounter additional drag that may move the UAV off the flight path and its sensors may not be directed as desired. The rudders may also be used to point or direct the UAV to allow the UAV's sensors and/or munitions to be aimed to a desired direction. It should be noted that while two rudders are shown in the embodiment of FIG. 10A, one or more than two rudders or other control surfaces, positioned at other locations along the fuselage or other component of the UAV may be employed. It should be noted that any such deployable control surface may be angled or canted so that it is capable of moving the UAV about more than one degree of freedom. In some embodiments, there may be more than a single actuator for two or more control surfaces such that the surfaces can be moved separately and/or independently from each other.

Figure 10B:
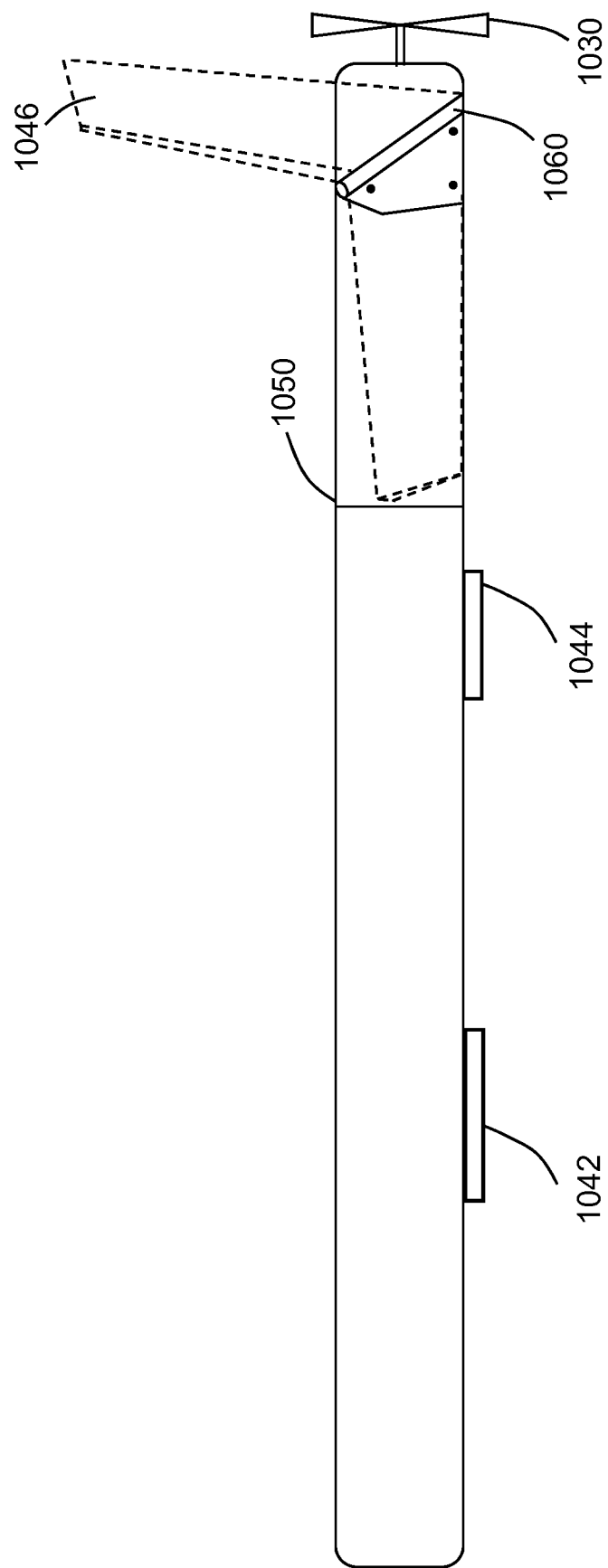
FIG. 10B depicts a side elevational view of an embodiment where the rudders are shown as they would deploy to control the yawing motion.

FIG. 10B depicts a side elevational view of FIG. 10A showing two positions of an exemplary rudders 1046. The rudder 1046 is depicted as it may sit against the fuselage wall and against the tapered aft portion 1050 and the rudder may deploy to control the yawing motion. An exemplary canted hinge line 1060 determines the axis of rotation, and serves as a pivot line for the rudder deployment. The hinge 1060 may include a spring to bias the rudder 1046 from its stored position against the fuselage portion 1050 up to its operational position as well as bias the rudder against the actuator. The figure also shows the wing 1042, tail 1044, and propeller 1030.

Figure 11A:
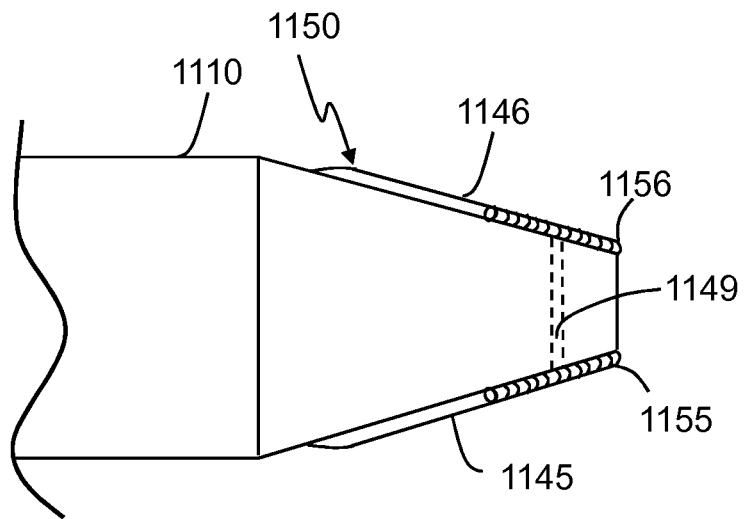
FIG. 11A depicts an exemplary pre-deployment position of the rudder surfaces.
Figure 11B:
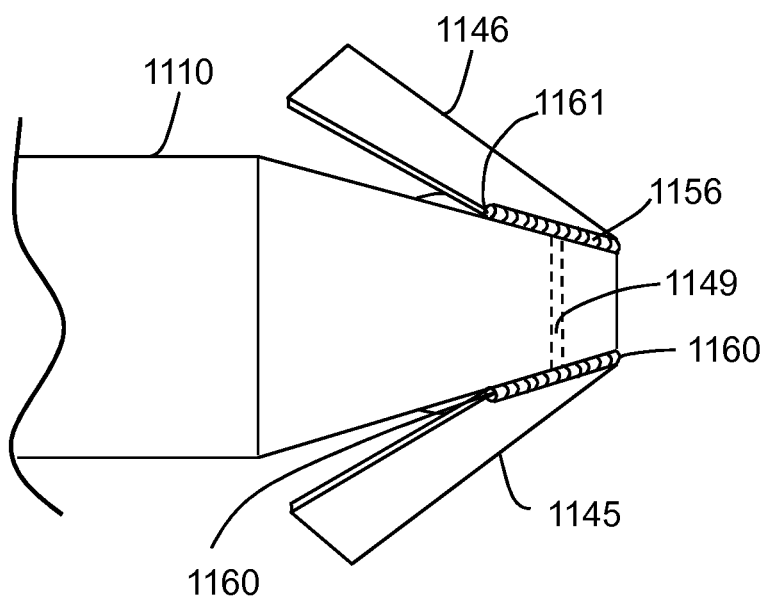
FIG. 11B depicts an exemplary beginning stage of deployment position of the rudder surfaces.
Figure 11C:
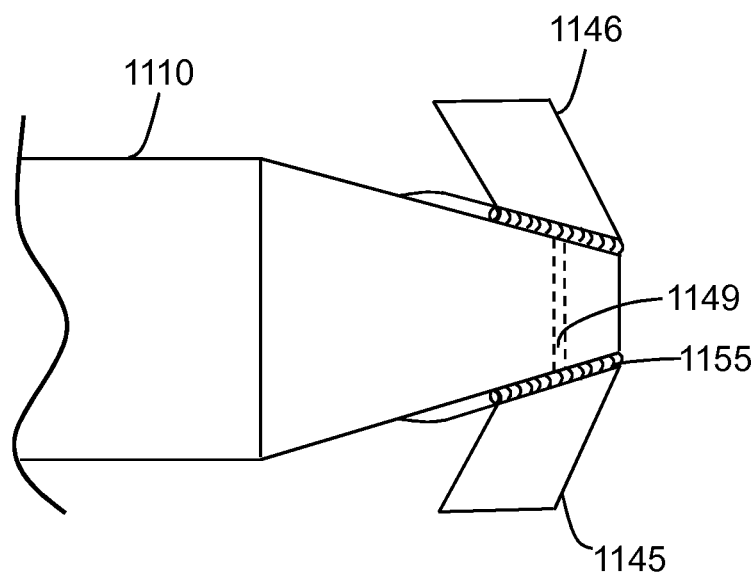
FIG. 11C depicts an exemplary stage of deployment position of the rudder surfaces.
Figure 11D:
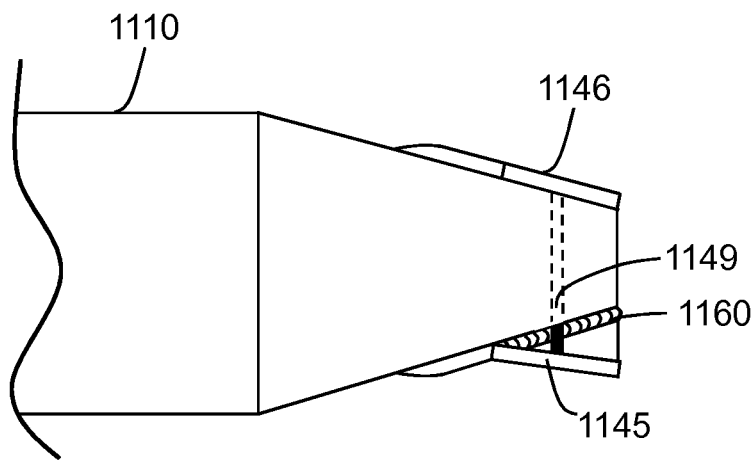
FIG. 11D depicts an exemplary stage of deployment position of the rudder surfaces as they are deployed and received by the actuator.

FIGS. 11A-11D depict in a top view, an exemplary deployment of the rudder surfaces 1145,1146. FIG. 11A shows in top view a portion of the exemplary UAV with rudder surfaces 1145,1146—in a folded state—and an effector element, e.g., a rod 1149. The UAV as shown is in the pre-deployment stage and the rudders 1145,1146 are forward and flush against the tapered aft portion 1150 of the fuselage 1110. Hinges 1155,1156 are shown connecting the rudders to the fuselage. FIG. 11B shows the UAV in the beginning stages of deployment, where the rudders 1145,1146 may be forced to deploy from the dynamic pressure on the surfaces and/or, as in this example, from a spring load force. The springs providing such force can be positioned at or about the hinges where the springs apply forces on the rudders to move them from the stored position to the operational position and to bias them thereafter. As illustrated, the rudders 1145,1146 rotate about the hinges 1155,1156 with the hinge-axis 1160,1161 respectfully, as they are being deployed. FIG. 11C shows the rudders 1145,1146 further along in deployment as the rudders 1145,1146 have rotated about the hinge-axis 1160. FIG. 11D shows the actuator horn or rod 1149—as it projects out of the fuselage and above the hinge-axis 1160—so as to facilitate engaging the rudders 1145,1146 once deployed. The actuator rod 1149 is shown as extended out of the fuselage body where it may engage the rudders 1145,1146 after deployment and stop the rotational movement at each end of the rod. The rudders 1145,1146 may be connected to the rod ends 1147,1148 via a fastening means, e.g., a set of at least magnets, clasps, clips, flanges, pegs, pins, Velcro™, or combinations thereof. In this example, the length of the actuator rod 1149 may not extend beyond the lateral width of the fuselage minus the width of the surface of the rudders 1145,1146.

Figure 12A:
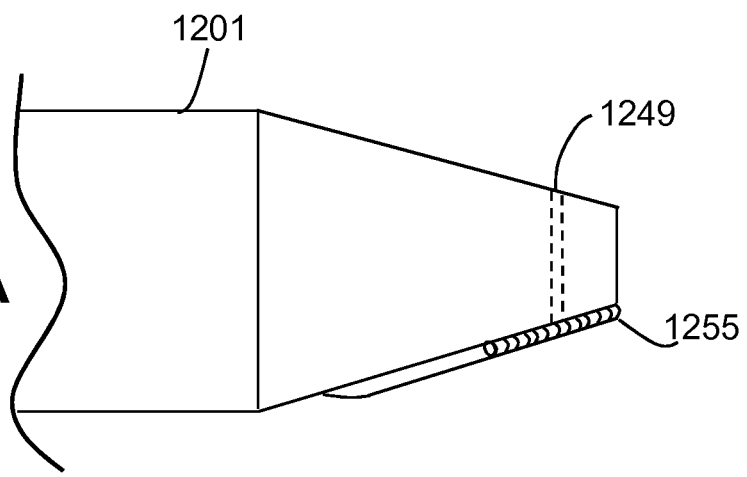
FIG. 12A is a plan view of a portion of an air vehicle embodiment depicting the rotation of a single rudder.
Figure 12B:
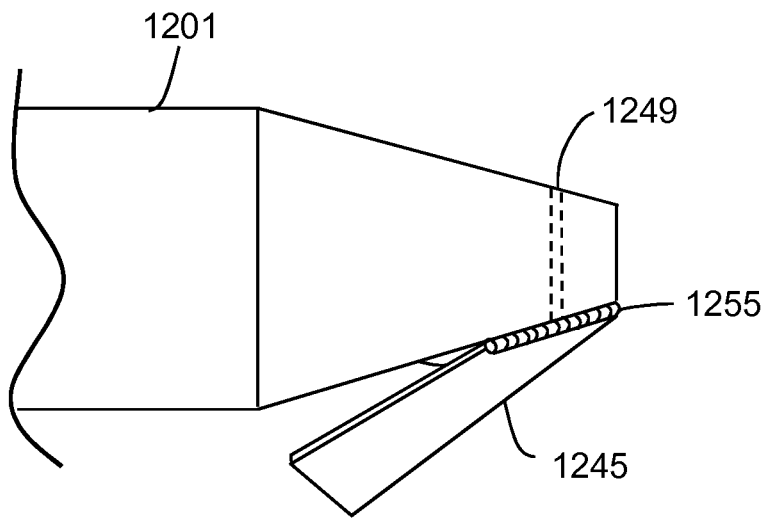
FIG. 12B is a plan view of a portion of an air vehicle embodiment depicting the next stage of rotation of a single rudder.
Figure 12C:
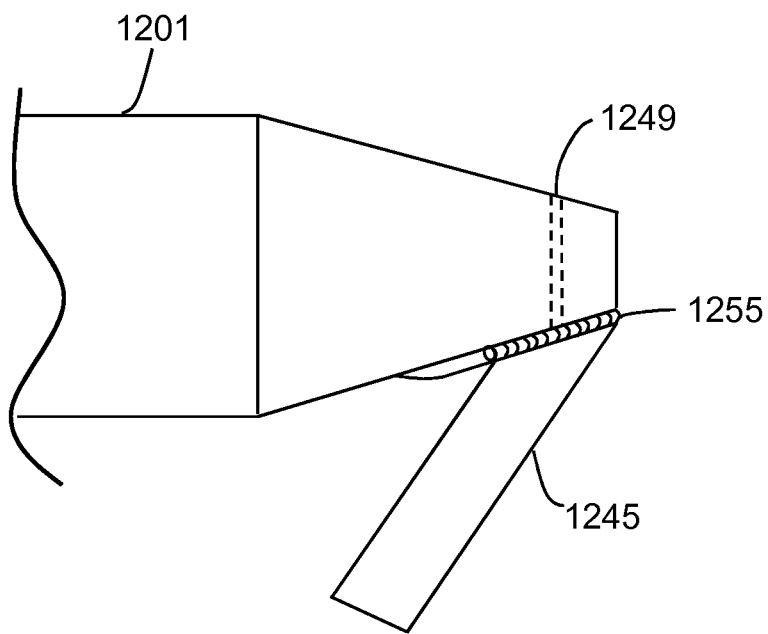
FIG. 12C is a plan view of a portion of an air vehicle embodiment depicting the next stage of rotation of a single rudder.
Figure 12D:
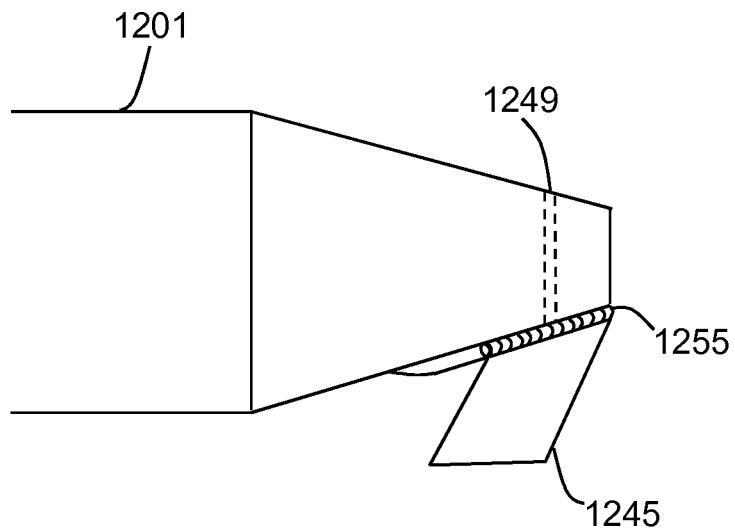
FIG. 12D is a plan view of a portion of an air vehicle embodiment depicting the next stage of rotation of a single rudder.
Figure 12E:
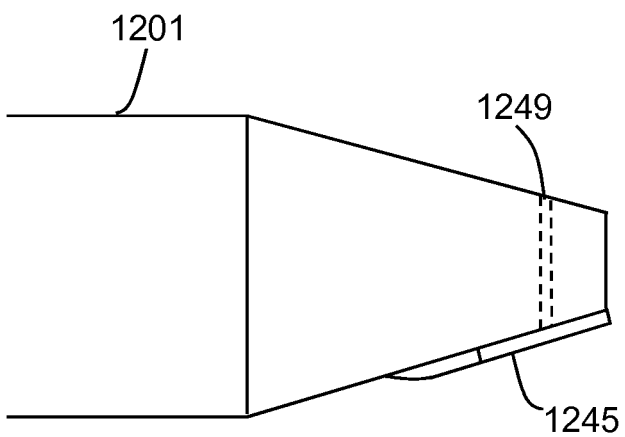
FIG. 12E is a plan view of a portion of an air vehicle embodiment as the rudder has attached to the fuselage wall.
Figure 12F:
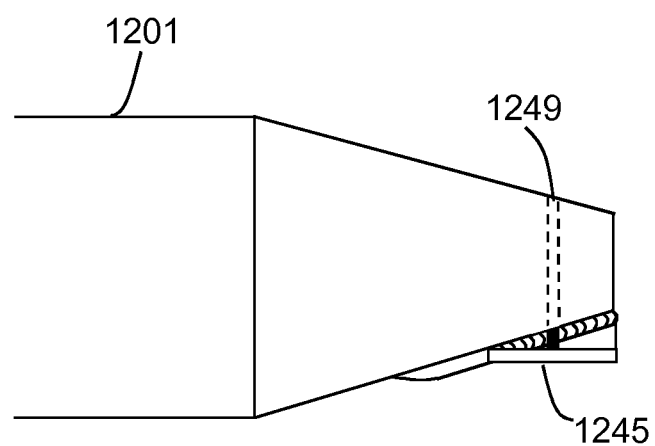
FIG. 12F is a plan view of a portion of an air vehicle embodiment with the effector member attached to the rudder and holding it in place.

FIGS. 12A-12F depict an exemplary deployment of a single rudder surface 1245 system as it moves through in different stages. FIG. 12A shows in top view the exemplary UAV where the yaw control is shown as having one rudder 1245. This view focuses on the rudder—in a folded state— and an effector element, e.g., a rod 1249. This embodiment depicts the rudder as a forward-folding vertical tail before being deployed from the launcher tube. The rod 1249 is placed inside the fuselage housing 1201 and may be used for actuating the movement of the rudder 1245. FIG. 12B shows the same UAV as FIG. 12A—as the UAV is being deployed and exiting the launcher tube—where the rudder 1245 rotates about an axis 1260, e.g., a hinge line. FIG. 12C shows the rudder 1245 further along in the deployment stage as the rudder 1245 continues to rotate about the hinge-axis 1260. A bigger portion of the top surface area of the rudder is visible at this point. In FIG. 12D as the rudder 1245 continues movement along the axis line, less of the top surface is visible from this top view. FIG. 12E shows the end of deployment with the fully deployed rudder 1245 abutting the fuselage wall. FIG. 12F further shows the same UAV where the rudder 1245 has fully deployed after exiting the launcher tube and has come into contact with the rod 1249. In some embodiments, the rod 1249 as depicted in this figure may have magnets on the ends with metal tab on the rudder 1245 to facilitate the capturing of the rudder 1245. FIG. 12F also depicts the movement of the rudder as it is being engaged by the actuator rod and shows the rotational axis associated with the rudders.

FIG. 13A depicts a side view of the tapered aft portion of the fuselage 1301 where the rudder 1345 and the propeller 1330—both in a folded state—have wrapped around and tucked inward as the UAV may be inside a launcher tube or in a pre-deployment stage. This view further depicts the position of an exemplary actuator rod 1349 as it may sit inside the fuselage housing 1301, and extends out from two opposing apertures located above a rudder axis of rotation, e.g., hinge line 1355. This view shows the axis of rotation, canted relative to the longitudinal axis of the UAV. The canted hinge line may range from greater than zero up to 90 degrees. Some embodiments as shows in these examples have a canted angle which ranges between 30 to 60 degrees. A canted angle of 45 degree may be used. FIG. 13B depicts the same side view, the rudders 1345,1346 of the UAV as it is being deployed and demonstrates the position of the propeller 1330 after deployment and the rudders 1345,1346 as they are rotating about the axis of the hinge line 1355. FIG. 13C shows the rudders 1345,1346 fully deployed and the actuator rod fastened to the rudders via a fastening method, e.g., a set of at least magnets, clasps, clips, flanges, pegs, pins, Velcro™, or combinations thereof. The actuator rod 1349 may be controlled via an actuator, e.g., a set of at least electro mechanical linkage, a gear or gear assembly, and/or worm-gear. In one embodiment, the rotation of the rudders may be via the actuator engaging the rod to translate the rod against the spring return force of resiliently mounted rudders. The actuator rod serves to ensure the rudders 1345,1346 move in cooperation with each other thereby providing yaw control.

Figure 13D:
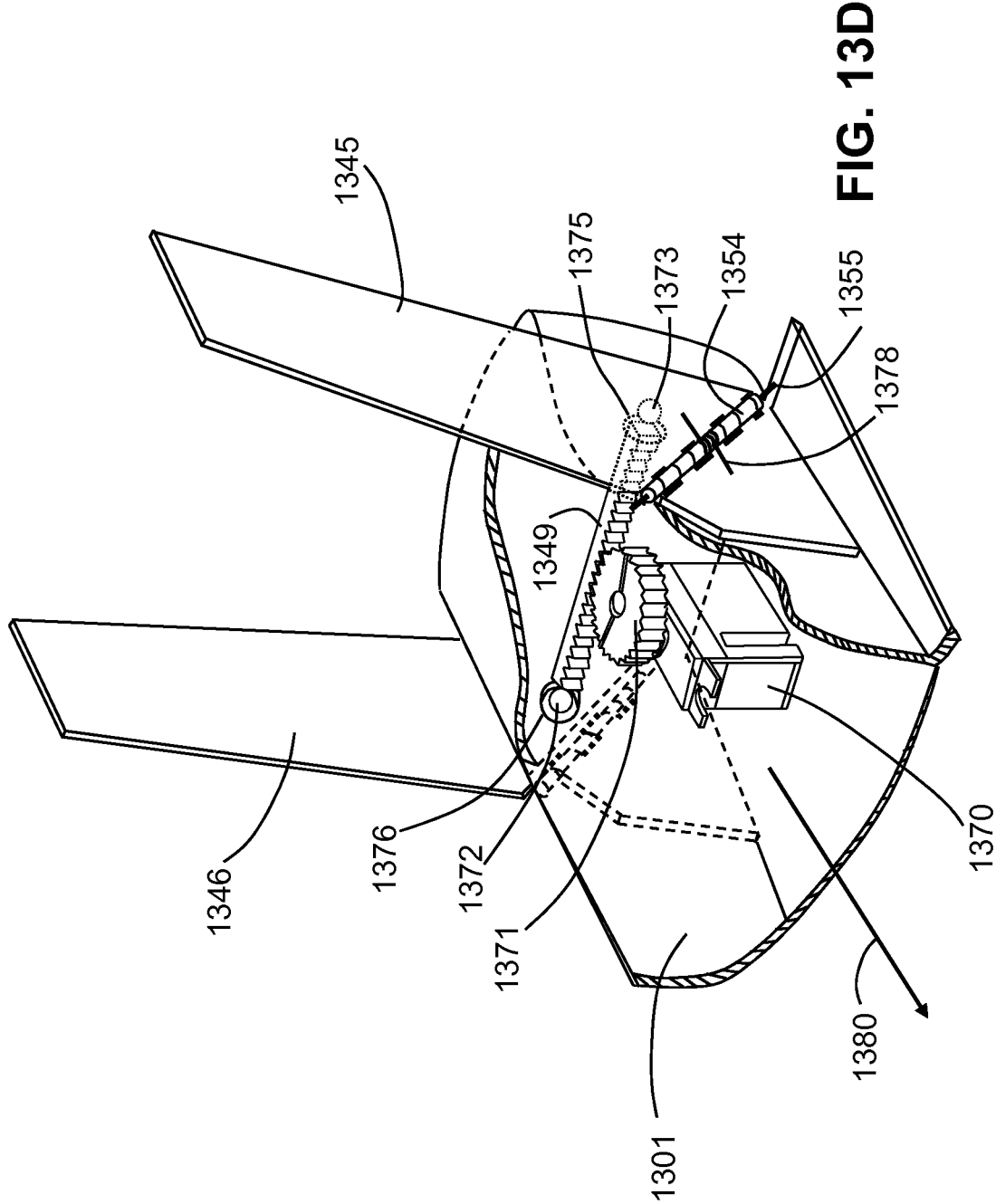
FIG. 13D is a cut-away view of the aft section of an air vehicle depicting an actuator effecting an actuator rod.

FIG. 13D is a cut away-view of an aft section of an embodiment depicting the fuselage 1301 where the rudders 1345,1346—both deployed—have been engaged by an effector member, e.g., a rod 1349. The actuator rod 1349 is depicted as housed inside the fuselage 1301, and extending outside of the fuselage from two opposing apertures 1375, 1376 located above a rudder axis of rotation of a hinge 1354, e.g., a canted hinge line 1355. In some embodiments the hinge 1354 may comprise a spring element 1378 about a portion of the hinge, where the spring may function to deploy the rudders 1345,1346, and may bias the rudders 1345,1346 against the actuator rod 1349 when the rudders 1345,1346 are in operational position. FIG. 13D further depicts the rudders 1345,1346 abutting to the actuator rod 1349, and where the actuator rod 1349 is depicted as slidably supported by a back structural element (not shown). The actuator rod 1349 may comprise bulbous ends 1372,1373 to connect to or abut the rudders 1345,1346. The actuator rod 1349 may have teeth that mesh with a disk 1371 having compatible teeth converge at each apex. The actuator 1370 effects the movement of the rudders 1345,1346 by engaging the actuator rod 1349 via the disk 1371 by causing the disk 1371 to rotate—about an axis depicted as perpendicular to the longitudinal axis 1380 of the UAV.

FIGS. 14A-14F depict a back view of an exemplary deployment of the rudder surfaces 1445,1446 and the UAV fuselage 1410. FIG. 14A is a back view of a tapered aft portion 1450 of the fuselage depicting the rudders 1445, 1446 as being in a folded state. In this embodiment the hinge line 1460 can be seen as it tapers from the aft portion of the fuselage towards the mid body. The hinge line 1460 is canted at a selected degree relative to the longitudinal axis of the fuselage. FIG. 14B is the same back view of the tapered aft portion depicting the rudders 1445,1446 as being in the beginning stages of deployment. In this embodiment, once released, a resiliently mounted force or a spring loaded hinge—in conjunction with wind resistance—may facilitate the motion of the rudders about the hinge line 1460. FIG. 14C depicts the rudders 1445,1446 as they are in mid-deployment, and rotating about the pivot line, e.g., the canted hinge line 1460. Wind resistance may be at the highest point during a launch at this stage of deployment and so may push the rudders toward the aft portion of the fuselage. FIG. 14D further depicts the rudders 1445,1446 as they near the end of their deployment, and may stand against the tapered fuselage wall as deployed. FIG. 14E depicts the rudders 1445,1446 as being engaged by the actuator and in this example, the rod 1449, which acts as a stopper to keep the rudders in position, at which point they can achieve the least amount of air resistance as they may be edge on into the wind vector. FIG. 14F depicts the movement of the rudders as they are engaged by the actuator rod 1449, and depict the rotational axis associated with the rudders. In this embodiment, the rod pushes one of the rudders 1446 laterally so as control the yawing motion of the UAV, e.g., to point the centerline of the UAV, and the other rudder 1445 is pulled and/or forced by wind, resilient hinge, and/or spring load force.

Figure 15A:
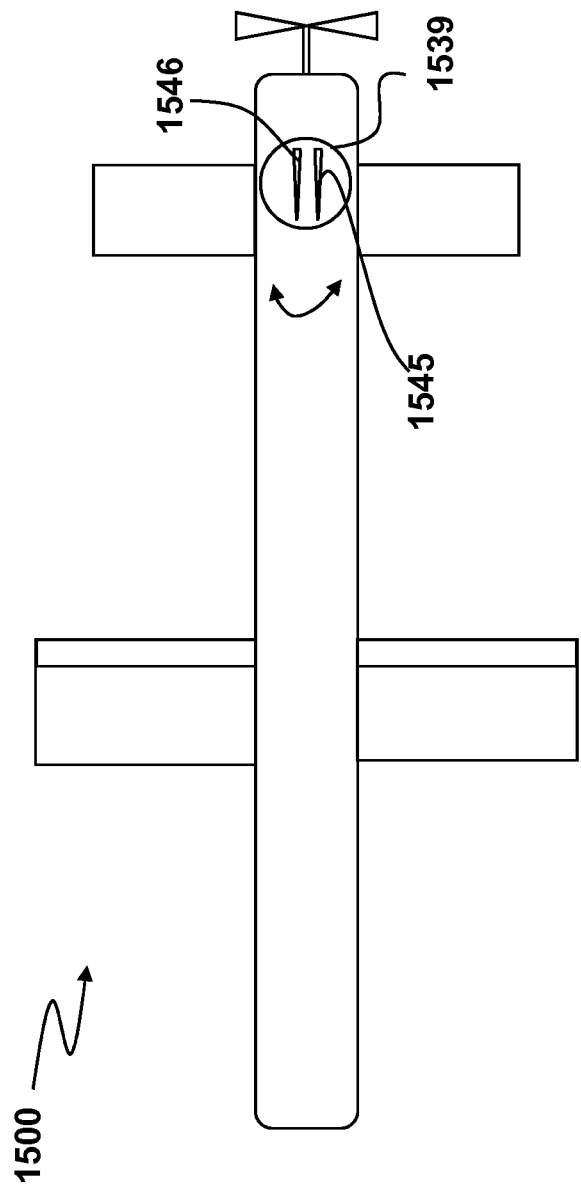
FIG. 15A is a plan view of an air vehicle embodiment showing a rotatable surface with rudders mounted on the platform.
Figure 15B:
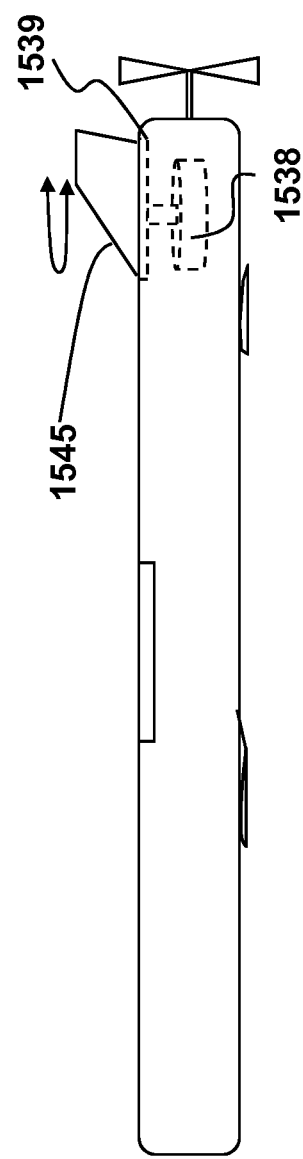
FIG. 15B is a side elevational view of the air vehicle embodiment showing a rotatable surface with rudders mounted on the platform.

FIG. 15A illustrates a top view of an exemplary embodiment of the UAV portion 1500. This view shows a rotatable surface 1539 with the rudder surfaces 1545,1546 mounted on the platform 1539—with the rudder surfaces depicted as perpendicular to the platform—and an actuator inside the fuselage which may control the rotational movement of the platform 1539. FIG. 15B shows in side view the exemplary UAV where the rudder surface 1545 is shown mounted substantially perpendicular to the longitudinal axis of the UAV. The rudder 1545 is depicted as being fixed to the rotatable surface where the rotatable surface 1539 and a portion of the fuselage housing are coplanar. In one embodiment the platform 1539 may be in a well of the fuselage where the actuator shaft has a seal ring in order to facilitate blocking the entrance of environmental elements. In some embodiments the rudders 1545,1546 include a hinge and spring at their roots so that the rudders can be folded flat against the fuselage for storage and then be deployed to a substantially vertical position for operation.

Figure 16:
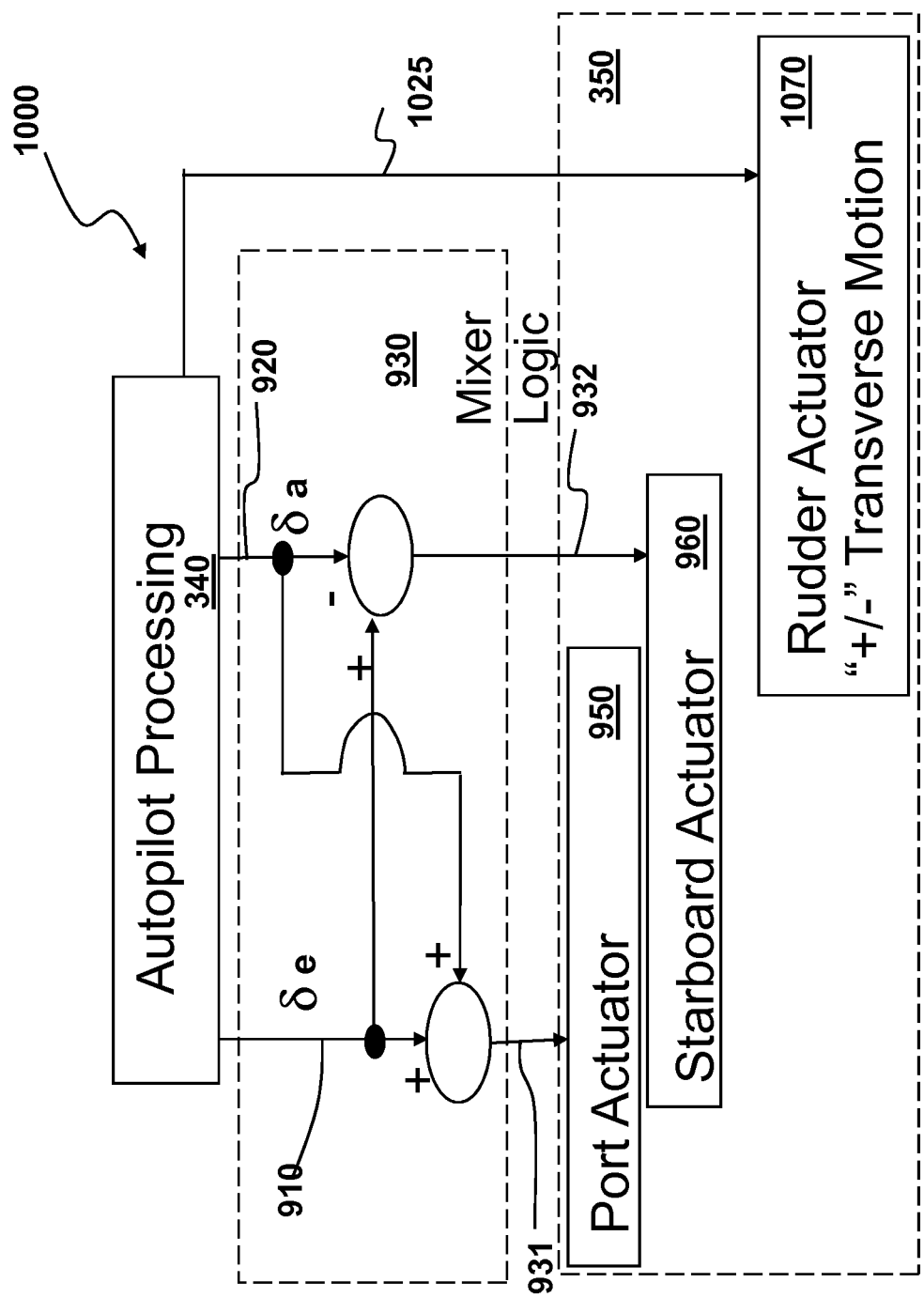
FIG. 16 depicts a functional block diagram where an elevator command, an aileron command, and a rudder command may be output and combined to provide commands to a port actuator and a starboard actuator.

FIG. 16 depicts a functional block diagram 1000 where, from autopilot processing 340, an elevator command 910, $\delta_e$, aileron command 920, $\delta_a$, and rudder command 1025, $\delta_r$, may be output as voltage commands and may be combined according to mixer logic 930 to provide a port actuator command 931, a starboard actuator command 932, and a rudder actuator command 1070. The mixer logic 930 may be embodied as part of the autopilot processing or embodied as a separate module or circuit. A port actuator 950 may be configured where positive voltages drive the port actuator horn in a retracting direction and negative voltages drive the port actuator horn in an extending direction. Likewise, a starboard actuator 960 may be configured where positive voltages drive the starboard actuator horn in a retracting direction and negative voltages drive the starboard actuator horn in an extending direction. The port actuator 950 and starboard actuator 960 may be configured with extension/retraction feedback that may further regulate and/or refine the actuator horn positioning. In some embodiments, the air vehicle may be configured so that the trailing edges maybe initially deflected upward due to the rotational force provided by each of the respective resilient members. In an example where the airfoils are disposed along the bottom of the fuselage and the top of the fuselage is oriented skyward, the trailing edge deflections may produce upward pitching moments that in turn may be reduced or brought to null, i.e., trim, by the rotational extension of each of the actuator horns. In some embodiments, linear actuators may replace the exemplary rotational actuators actuating the contact horns or rod.

It is contemplated that various combinations and/or subcombinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further it is intended that the scope of the present invention herein disclosed by way of examples should not be limited by the particular disclosed embodiments described above.

What is claimed is:

1. An air vehicle system, comprising:
    a fuselage;
    a first pair of airfoils rotatable between a retracted position and a deployed position, the deployed position extending out from the fuselage and the retracted position extending substantially along an exterior of the fuselage;
    a second pair of airfoils rotatable between a second retracted position and a second deployed position, the second deployed position extending out from the fuselage and the second retracted position extending substantially along the exterior of the fuselage;
    a rudder foldable against the fuselage in a pre-deployment position, wherein the rudder is disposed about a hinge, wherein the hinge extends along an aft portion of the fuselage, wherein the hinge has a canted angle relative to a longitudinal axis of the aerial vehicle of between thirty degrees and sixty degrees, wherein the rudder is configured to rotate about the hinge from the pre-deployment position to a deployed position, and wherein the rudder is configured to rotate about an axis of the hinge line after deployment so as to provide a yaw control;
    one or more power sources disposed in the fuselage, wherein the one or more power sources do not extend beyond the lateral width of the fuselage;
    a homing sensor disposed in a front end of the fuselage, wherein the front end of the fuselage is in front of the first pair of airfoils, and wherein the homing sensor does not extend beyond the lateral width of the fuselage; and
    a warhead disposed in the front end of the fuselage, wherein the warhead does not extend beyond the lateral width of the fuselage;
    wherein each of the first and second pairs of airfoils have respective constant chords along their span, and wherein each of the respective constant chords approximates a maximum fuselage width.

2. The air vehicle system of claim 1, wherein a span of each pair of airfoils is less than the length of the fuselage.

3. The air vehicle system of claim 1, wherein each of the first and second pairs of airfoils have chords that do not exceed a maximum fuselage width.

4. The air vehicle system of claim 1, wherein the rudder is foldable against a tapered surface of a tapered portion of the fuselage.

5. The air vehicle system of claim 1, further comprising a propeller, wherein the propeller is foldable against a tapered portion of the fuselage.

6. The air vehicle system of claim 1, wherein the rudder is deployable in response to wind resistance during launch.

7. The air vehicle system of claim 1, wherein the rudder is deployable in response to a resiliently mounted force, and wherein the resiliently mounted force is provided by a spring loaded hinge.

8. The air vehicle system of claim 1 further comprising:
    an actuator rod disposed in the aft portion of the fuselage;
    an aperture disposed in the fuselage, wherein the actuator rod is operable to extend through the aperture to engage and rotate the rudder about the axis of the hinge line after deployment.

9. The air vehicle system of claim 1, wherein the fuselage is inside a launcher tube;
    wherein the first pair of airfoils in the retracted position are inside the launcher tube;
    wherein the second pair of airfoils in the second retracted position are inside the launcher tube;
    wherein the rudder in the pre-deployment position is inside the launcher tube; and
    wherein a propeller folded about the fuselage is inside a launcher tube.

10. The air vehicle system of claim 1, wherein the first pair of airfoils are rotatable about a forward pivot point, and wherein the first pair of airfoils are stacked when in the retracted position.

11. The air vehicle system of claim 1 further comprising:
    an actuator horn, wherein the actuator horn is configured to extend from an aperture in the fuselage to contact a control surface structural element of the first pair of airfoils when the first pair of airfoils is in the deployed position, wherein the extended actuator horn angularly deflects a top surface of the control surface structural element relative to a top surface of a main lifting structural planar element of the first pair of airfoils, wherein the actuator horn is configured to retract when the first pair of airfoils is in the deployed position, and wherein the retracted actuator horn elevates the top surface of the control surface structural element relative to the top surface of the main lifting structural planar element; and
    a resilient element mounted between the main lifting structural planar element and the control surface structural element, wherein the top surface of the control surface structural element is elevated relative to the top surface of the main lifting structural planar element based on the retracted actuator horn and a resilience of the resilient element.

12. The air vehicle system of claim 1, further comprising: a propeller foldable about the fuselage.

13. A method of operating an aerial vehicle, comprising:
    rotating a first pair of airfoils from a retracted position extending substantially along an exterior of a fuselage to a deployed position extending out from the fuselage, wherein each airfoil of the first pair of airfoils comprises a main lifting structural planar element and a control surface structural element;
    rotating a second pair of airfoils from a second retracted position extending substantially along the exterior of the fuselage to a deployed position extending out from the fuselage; and
    rotating a vertical tail about an axis, wherein an inner surface of the rotated vertical tail abuts a fuselage wall of the fuselage prior to rotation;
    extending an actuator horn from an aperture in the fuselage to contact the control surface structural element when the first pair of airfoils is in the deployed position, wherein the extended actuator horn angularly deflects a top surface of the control surface structural element relative to a top surface of the main lifting structural planar element;

retracting the actuator horn when the first pair of airfoils is in the deployed position, wherein the retracted actuator horn elevates the top surface of the control surface structural element relative to the top surface of the main lifting structural planar element based on the retracted actuator horn and a resilience of a resilient element, wherein the resilient element is mounted between the main lifting structural planar element and the control surface structural element;

homing on a target via a homing sensor disposed in a front end of the fuselage, wherein the front end of the fuselage is in front of the first pair of airfoils, and wherein the homing sensor does not extend beyond the lateral width of the fuselage; and deploying a warhead disposed in the front end of the fuselage to the target, wherein the warhead does not extend beyond the lateral width of the fuselage;

wherein each of the first and second pairs of airfoils have respective constant chords along their span, and wherein each of the respective constant chords approximates a maximum fuselage width.

* * * * *